(12) United States Patent
Omori et al.

(10) Patent No.: US 7,713,466 B2
(45) Date of Patent: May 11, 2010

(54) VALVE ACTING METAL SINTERED BODY, PRODUCTION METHOD THEREFOR AND SOLID ELECTROLYTIC CAPACITOR

(75) Inventors: Kazuhiro Omori, Kanagawa (JP); Yoshinori Shibuya, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 857 days.

(21) Appl. No.: 10/554,694

(22) PCT Filed: Apr. 27, 2004

(86) PCT No.: PCT/JP2004/006102

§ 371 (c)(1),
(2), (4) Date: Oct. 27, 2005

(87) PCT Pub. No.: WO2004/097870

PCT Pub. Date: Nov. 11, 2004

(65) Prior Publication Data

US 2006/0279908 A1    Dec. 14, 2006

Related U.S. Application Data

(60) Provisional application No. 60/467,152, filed on May 2, 2003.

(30) Foreign Application Priority Data

Apr. 28, 2003    (JP) ............................. 2003-123208

(51) Int. Cl.
*B22F 3/00* (2006.01)
(52) U.S. Cl. ............................................. 419/2; 419/37
(58) Field of Classification Search .................. 419/2
See application file for complete search history.

(56) References Cited

U.S. PATENT DOCUMENTS

| | | | |
|---|---|---|---|
| 1,728,941 A |  | 9/1929 | Marden et al. |
| 3,627,520 A | * | 12/1971 | Rogers ........................... 419/2 |
| 3,802,878 A | * | 4/1974 | Lindstrom ...................... 419/2 |
| 4,084,965 A |  | 4/1978 | Fry |
| 4,097,415 A | * | 6/1978 | Moulin et al. ................ 252/512 |
| 4,229,217 A | * | 10/1980 | Hahn .......................... 75/244 |
| 4,659,528 A | * | 4/1987 | Plowman et al. .............. 264/49 |
| 4,687,632 A |  | 8/1987 | Hurd et al. |
| 4,957,541 A | * | 9/1990 | Tripp et al. ................... 75/245 |
| 5,082,491 A |  | 1/1992 | Refat |
| 6,024,914 A |  | 2/2000 | Yoshida |
| 6,238,456 B1 |  | 5/2001 | Wolf et al. |
| 6,934,146 B2 |  | 8/2005 | Omori et al. |
| 2003/0183042 A1 |  | 10/2003 | Oda et al. |
| 2003/0205106 A1 |  | 11/2003 | Omori et al. |
| 2004/0042154 A1 | * | 3/2004 | Naito et al. ................. 361/305 |

FOREIGN PATENT DOCUMENTS

| | | |
|---|---|---|
| CN | 1294747 A | 5/2001 |
| JP | 48-25859 A | 4/1973 |
| JP | 52-109409 A | 9/1977 |
| JP | 56-45015 A | 4/1981 |
| JP | 61-90411 A | 5/1986 |
| JP | 2-34701 A | 2/1990 |
| JP | 02-254108 | 10/1990 |
| JP | 4-247807 A | 9/1992 |
| JP | 6-128604 A | 5/1994 |
| JP | 6-252011 A | 9/1994 |
| JP | 8-39946 A | 3/1996 |
| JP | 8-69946 | 3/1996 |
| JP | 9-74051 A | 3/1997 |
| JP | 9-78101 A | 3/1997 |
| JP | 10-242004 A | 9/1998 |
| JP | 10-275746 A | 10/1998 |
| JP | 11-224833 | 8/1999 |
| JP | 2000-119710 A | 4/2000 |
| JP | 2001-345238 A | 12/2001 |
| JP | 2002-25864 A | 1/2002 |
| JP | 2002-305129 A | 10/2002 |
| JP | 2003-89801 A | 3/2003 |
| WO | WO 98/37249 A | 8/1998 |
| WO | 00/49633 A1 | 8/2000 |
| WO | WO 01/91953 A | 12/2001 |
| WO | WO 02/15208 A1 | 2/2002 |
| WO | 02/092864 | 11/2002 |
| WO | 02/092864 A2 | 11/2002 |
| WO | WO 03/015961 A1 | 2/2003 |

* cited by examiner

*Primary Examiner*—Roy King
*Assistant Examiner*—Ngoclan T Mai
(74) *Attorney, Agent, or Firm*—Sughrue Mion, PLLC

(57) ABSTRACT

The invention provides a valve-acting metal sintered body for anode of a solid electrolytic capacitor, having a high capacitance, well impregnated with cathode material, and exhibiting excellent properties particularly when having a large volume, a capacitor having a low ESR, an excellent tan δ value and good long-term reliability such as moisture resistance and heat resistance by using the sintered body, and a production method therefor comprising the following steps: coating/printing/shaping a granulated product of a mixed dispersion containing a pore-forming agent, an organic binder and a primary powder or secondary aggregated powder of at least one member selected from valve-acting metal, a valve-acting metal compound and a valve-acting metal alloy or a granulated powder thereof, and a solvent, or compressing and shaping the granulated product of a mixture obtained by removing the solvent from the dispersion; sintering the shaped article containing a pore-forming agent; and removing the pore-forming agent from the sintered body.

28 Claims, 1 Drawing Sheet

VALVE ACTING METAL SINTERED BODY, PRODUCTION METHOD THEREFOR AND SOLID ELECTROLYTIC CAPACITOR

CROSS-REFERENCE TO RELATED APPLICATIONS

This is an application filed pursuant to 35 U.S.C. Section 111(a) with claiming the benefit of U.S. provisional application Ser. No. 60/467,152 filed May 2, 2003 under the provision of 35 U.S.C. 111(b), pursuant to 35 U.S.C. Section 119(e)(1).

TECHNICAL FIELD

The present invention relates to a method for producing a valve-acting metal sintered body for use as the anode of a solid electrolytic capacitor and also relates to a solid electrolytic capacitor using the sintered body for the anode. More specifically, the present invention relates to a method for producing a niobium or tantalum sintered body for use as the anode having a high capacitance per unit mass, in which the powder of niobium, a niobium compound, a niobium alloy, tantalum, a tantalum compound or a tantalum alloy is used as the valve-acting metal, and also relates to a solid electrolytic capacitor using the sintered body for the anode.

BACKGROUND ART

The capacitor for use in electronic devices such as cellular phone and personal computer is demanded to have a large capacitance with a small size. Among these capacitors, a tantalum capacitor and a niobium capacitor have a large capacitance for the size and also have good performance and therefore, these capacitors are being preferably used. In recent years, electronic devices are demanded to be driven at a low voltage and a high frequency with low noises and in order to cope with this, the solid electrolytic capacitor is also demanded to have higher capacitance, lower ESR (equivalent series resistance) and enhanced tan δ property.

The anode generally used in the capacitor using valve-acting metal is a sintered body of valve-acting metal powder. For example, a niobium powder is granulated by mixing the niobium powder with a liquid binder and then shaped by press-shaping and after implanting an anode lead thereto, the shaped article is sintered at a high temperature in a high vacuum to obtain an electrode called a sintered body. The inside of the sintered body takes a three-dimensional complicated form such that the powder particles are electrically and mechanically connected with each other. After a dielectric film is formed on the surface including the surfaces of inside voids of the sintered body, the sintered body is impregnated with a material working out to a counter electrode, thereby fabricating a capacitor. Microscopically, the capacitance of the produced capacitor greatly depends on the contacting state between the counter electrode material and the dielectric film layer as long as the dielectric film layer is uniformly attached to the surfaces inside and outside the sintered body.

In order to increase the capacitance of such a valve-acting metal capacitor, the mass of the sintered body must be increased or a sintered body increased in the surface area by finely pulverizing the valve-acting metal powder must be used.

The method of increasing the mass of the sintered body is disadvantageous in that the shape of the capacitor is inevitably increased and the demand for downsizing cannot be satisfied. On the other hand, the method of increasing the specific surface area by finely pulverizing valve-acting metal powder has a problem that the pore diameter of the valve-acting metal sintered body decreases or the number of closed pores increases at the sintering step to make it difficult to impregnate the sintered body with a cathode material in a later step.

Assuming that the capacitance realization ratio (also called an impregnation ratio of cathode material) is 100% when an aqueous phosphoric acid solution is used as the counter electrode material and complete contact state between the dielectric film layer and the cathode material is formed, for example, a capacitance realization ratio of 100% is difficult to attain in a case where an electrode material having large viscosity, especially a solid electrode material is used. In particular, when the average particle size of the valve-acting metal powder is small or when the sintered body produced from the valve-acting metal powder has a large shape, the difficulty increases. In an extreme case, only a capacitance realization ratio of less than 50% results. In such a case where only a low capacitance realization ratio can be attained, it is needless to say that a valve-acting metal capacitor having high capacitance cannot be produced and moreover, reduction of ESR, satisfactory tan δ property and sufficiently high humidity resistance cannot be obtained.

One of techniques considered to solve these defects in the valve-acting metal sintered body having high capacitance is a capacitor using, as the electrode, a sintered body where pores of the sintered body are enlarged to enhance the impregnation property of the counter electrode material having large viscosity, especially a cathode material which is a solid electrode material, and thereby enable the realization of high capacitance, low ESR, low tan δ value and long-term reliability.

JP-A-48-25859 (the term "JP-A" as used herein means an "unexamined published Japanese patent application") discloses a method for producing a porous electrode for capacitors, where a compound having an evaporation point lower than the sintering temperature is added to a metal powder such as tantalum or niobium and the compound evaporates and disperses at the time of sintering, thereby forming pores. Powders of aluminum fluoride, bismuth fluoride, zinc fluoride, lead fluoride and cadmium fluoride are described as examples of the compound added. It is stated that this compound is gradually transpired in the sintering step and completely transpired at a predetermined temperature. The pores formed after the transpiration of the compound shrink by being exposed to a high temperature of 1,500° C. and therefore, the resulting pores do not remain to effect a high capacitance. As a result, the produced capacitor is caused to have a very small capacitance of 10 to 16 μF and a very large tan δ of 7 to 9%.

JP-A-56-45015 discloses a method for producing an anode, where a substance having a melting point lower than a valve-acting metal powder such as tantalum and niobium is added to the powder, and the substance added is transpired by exposing it to a high temperature in a vacuum, thereby forming pores. Zinc and aluminum metals are described as examples of the substance added. In this method, the transpiration also takes place during sintering and therefore, due to shrinking caused by high temperature, the pores cannot remain to effect a high capacitance, as a result, the produced capacitor have a very small capacitance of 2.4 to 2.5 μF and a very large ESR of 140 mΩ.

JP-A-10-275746 discloses a method for producing a sintered body for capacitors, where vacancies are caused to remain by sintering a valve-acting metal powder having mixed therewith a granular binder of 50 μm or less in a vacuum at a high temperature of about 2,000° C. Polyvinyl alcohol, polyvinyl butyrate, polyvinyl acetate, polyethylene carbonate, methyl methacrylate, polyethylene-based resin, polyester-based resin and methacrylic resin are described as examples of the granular binder. These binders are organic polymers and decomposed and dissipated through a reaction such as depolymerization during sintering, which does not allow the pores to remain effective to achieve a high capacitance.

JP-A-11-181505 (U.S. Pat. No. 6,024,914) discloses a method for producing an anode sintered body for solid electrolytic capacitors, where an aggregated or granulated powder of a valve-acting metal such as tantalum, niobium and aluminum is shaped in combination with a solid organic material and the shaped article is sintered at a high temperature in a high vacuum. It is stated that a PVA (polyvinyl alcohol)-based or acrylic solid binder or camphor is preferred as the solid organic material. These solid organic materials are compounds of the same kind as the binder described in JP-A-10-275746, which are decomposed and dissipated through a reaction such as depolymerization during sintering and therefore, the pores cannot effect a high capacitance. As a result, although some improvement is seen in the ESR, the ESR of the sintered body is still as high as about 150 mΩ.

JP-A-9-74051 discloses a method for producing a sintered body for solid electrolytic capacitors, where a fiber comprising a methacrylic acid ester polymer, a polyethylene carbonate, a polypropylene carbonate, a polybutylene carbonate or the like after processing into a string shape is added and mixed to a valve-acting metal powder such as tantalum, titanium, niobium or aluminum and then the powder is shaped and sintered at a high temperature in a vacuum. These compounds are compounds of the same kind and have the same properties as the binder described in JP-A-10-275746 except for having a fiber shape, these compounds are decomposed and dissipated through a reaction such as depolymerization during sintering, and the pores cannot effect a high capacitance.

JP-A-6-252011 discloses a method for producing a porous sintered body for capacitors by shaping and sintering a valve-acting metal powder, where a thin sintered body is produced so as to shorten the vacancy path and a large number of the sintered bodies are stacked. In this method, more steps are required to stack a large number of thin sintered bodies for a capacitor unit than in a method where a single sintered body constitutes a capacitor, and this is economically disadvantageous, and at the same time, the capacitance efficiency is inferior, and a capacitor having a large capacitance cannot be produced.

JP-A-4-136102 (U.S. Pat. No. 5,082,491) discloses a technique where a liquid binder is mixed with a tantalum powder for electrolytic capacitors and the resulting granulated powder is graded to a particle size of 20 to 400 μm to obtain good flowability, then shaped and sintered. By grading the particle size, fine particles are removed and the void between granulated powder particles is once enlarged. However, this void becomes small due to compression at the shaping and a void almost the same as in the case of not performing the grading results. Therefore, the physical properties such as ESR cannot be improved.

JP-A-2001-345238 discloses a method for producing a porous sintered body, where a powder obtained by reducing potassium tantalum fluoride at 850° C. is ground by a bead mill to obtain a tantalum power having an average particle size of about 2 μm, the tantalum powder is mixed with a camphor emulsion, atomized and dried, the resulting granulated powder having a weak aggregating power is heated at 1,100° C. to produce a hard aggregated powder, the hard aggregated powder is mixed with magnesium chips and subjected to a deoxidation reaction at 800° C. to form vacancies of 1 to 20 μm, and the resulting tantalum or niobium aggregated powder is press-shaped to have a density of 4.5 to 5.0 g/cm$^3$ and then sintered at 1,000 to 1,400° C. to obtain a porous sintered body having a pore peak in the ranges from 0.08 to 0.5 μm and from 1 to 20 μm, with 5 vol % or more of the entire vacancy volume having a vacancy size of 1 to 20 μm. In Examples, a sintered body where from 7 to 9 vol % of the entire vacancy volume has a vacancy size of 1 to 20 μm is disclosed, however, vacancies of 1 μm or less occupy 90 vol % or more of the entire vacancy volume and these are very small vacancies having a vacancy peak top in the range from 0.08 to 0.5 μm. Therefore, the sintered body cannot be sufficiently impregnated with the cathode material and for example, a sintered body of 99,000 to 101,000 μFV/g produced in this method is caused to have a very high ESR of 550 to 600 mΩ. Furthermore, the method involves steps of exposing the sintered body to a high temperature of 800° C. or more as many times as four and the more times the sintered body is exposed to heat, the more the CV may disadvantageously decreases.

International Publication WO 02/092864 discloses a method for producing a niobium sintered body having a pore diameter distribution where two peak tops are present, one in the range from 0.2 to 0.7 μm and the other in the range from 0.7 to 3 μm, and the latter peak top has a large relative intensity. It is stated that the niobium sintered body having these two peaks can be produced by adjusting the applied pressure at the shaping to a specific applied pressure value. In this method, when the applied pressure value is decreased, the adhesive strength between the lead wire as the electrode wire and the shaped article sometimes decreases to increase the LC. Furthermore, in the case of a large sintered body having a volume exceeding 25 mm$^3$, the impregnation ratio of the cathode material does not reach 80% in some cases due to insufficient formation of pores and high capacitance and low ESR cannot be achieved at the same time.

JP-A-6-128604 discloses a method for producing a dense sintered member, where a metal working out to a matrix, such as tungsten, molybdenum, tantalum, niobium, chromium, cobalt, rhenium, iron, nickel and copper, is mixed with an oxide having an oxide-producing free energy lower than that of the matrix metal and having an oxygen amount lower than in the stoichiometric composition and then sintered. This method utilizes the activity of an oxygen-deficient oxide acting as a reducing agent. Aluminum and yttrium are described as examples of the oxygen-deficient oxide. In the sintered member produced by this method, the relative density is from 93 to 99% and almost no vacancy is present. Therefore, the sintered member cannot be impregnated with the cathode material and a capacitor having high capacitance and low ESR cannot be produced.

Under these circumstances, the present invention has been created and an object of the present invention is to provide a valve-acting metal sintered body for use as the anode of a solid electrolytic capacitor, mainly comprising valve-acting metal, a valve-acting metal compound and/or a valve-acting metal alloy, and a production method of the sintered body. The sintered body of the present invention, which can be sufficiently impregnated with cathode material and realizes a high capacitance with a low ESR and good tan δ property, enables production of a capacitor ensured with excellent long-term reliability such as humidity resistance and high-temperature loading. In particular, the sintered body is a high-capacitance sintered body having a CV value exceeding 40,000 μF·V/g, especially a large sintered body having a volume of 10 mm$^3$ or more.

The method for producing a sintered body for solid electrolytic capacitors of the present invention, which comprises a step of compressing and shaping a valve-acting metal powder for capacitors to form a shaped article and a step of sintering the shaped article at a high temperature, is characterized in that the shaped article is formed from a granulated product comprising a mixture containing a pore-forming agent, an organic binder and a primary powder or secondary aggregated powder of valve-acting metal or a granulated powder thereof, and that the pore-forming agent is removed after sintering the shaped article. Alternatively, the shaped article can be formed by coating and printing dispersion liquid of the granulated product comprising the mixture. Fine pores can be obtained in the sintered body by conducting the sintering with a pore-forming agent which is unremovable at the sintering temperature and removing the pore-forming agent remaining in the sintered body after sintering is completed. The position, number and amount of pore peaks optimal for the cathode material used can be adjusted by controlling the kind, average particle size and amount added of the pore-forming agent, thereby enhancing impregnation degree of the cathode material.

According to the method of the present invention, the position, number and amount of peaks in the pore diameter distribution of the sintered body used as the anode can be controlled. Particularly, in a large sintered body having a volume of 10 mm$^3$ or more and a porosity of 55 vol % or more, the volume of pores of 1 μm or more occupies 10 vol % or more of the entire vacancy volume. Therefore, a solid electrolytic capacitor, enhanced in impregnation of cathode material, having high capacitance, low ESR, good tan δ property and long-term reliability can be produced.

DISCLOSURE OF INVENTION

That is, the present invention relates to a method for producing a valve-acting metal sintered body for use as the anode of a solid electrolytic capacitor, and a solid electrolytic capacitor using the sintered body as the anode, which are described below.

1. A method for producing a valve-acting metal sintered body for use as the anode of a solid electrolytic capacitor, comprising a step of dispersing, coating and shaping a granulated product of a mixture containing a pore-forming agent, an organic binder and a primary powder or secondary aggregated powder of at least one member selected from a group consisting of valve-acting metal, a valve-acting metal compound and a valve-acting metal alloy or a granulated powder thereof, or a step of compressing and shaping the granulated product, a step of sintering the resulting shaped article, and a step of removing the pore-forming agent contained in the resulting sintered body.

2. A method for producing a niobium sintered body for use as the anode of a solid electrolytic capacitor, comprising a step of compressing and shaping a granulated product of a mixture containing a pore-forming agent, an organic binder and a primary powder or secondary aggregated powder of at least one member selected from a valve-acting metal, a a valve-acting metal compound and a valve-acting metal alloy or a granulated powder thereof, a step of sintering the resulting shaped article, and a step of removing the pore-forming agent contained in the resulting sintered body.

3. The production method as described in 1 or 2 above, wherein a step of doping the granulated product of the mixture with at least one element selected from the group consisting of nitrogen, oxygen, boron, phosphorus, sulfur, selenium and tellurium is provided before the step of forming the shaped article.

4. The production method as described in 1 or 2 above, wherein a step of doping the shaped article with at least one element selected from the group consisting of nitrogen, oxygen, boron, phosphorus, sulfur, selenium and tellurium is provided after the step of forming the shaped article but before the sintering step.

5. The production method as described in 1 or 2 above, wherein a step of doping the sintered body containing the pore-forming agent with at least one element selected from the group consisting of nitrogen, oxygen, boron, phosphorus, sulfur, selenium and tellurium is provided after the sintering step but before the step of removing the pore-forming agent.

6. The production method as described in any one of 1 to 5 above, wherein the valve-acting metal compound and valve-acting metal alloy each contains at least one element selected from the group consisting of hydrogen, beryllium, magnesium, calcium, strontium, barium, scandium, yttrium, titanium, zirconium, hafnium, vanadium, tantalum, chromium, molybdenum, tungsten, manganese, rhenium, ruthenium, osmium, rhodium, iridium, palladium, platinum, silver, gold, zinc, cadmium, mercury, boron, aluminum, gallium, indium, thallium, carbon, silicon, germanium, tin, lead, nitrogen, phosphorus, arsenic, antimony, bismuth, oxygen, sulfur, selenium, tellurium, lanthanum, cerium, praseodymium, neodymium, samarium, europium, gadolinium, terbium, dysprosium, holmium, erbium, thulium, ytterbium and lutetium.

7. The production method as described in 6 above, wherein the valve-acting metal compound and valve-acting metal alloy each contains tantalum or niobium.

8. The production method as described in 6 above, wherein the valve-acting metal compound and valve-acting metal alloy each contains -at least one selected from the group consisting of niobium monoxide, silicon nitride and antimony.

9. The production method as described in 8 above, wherein the silicon nitride is a compound represented by the formula $Si_\alpha N_\beta$ (in the formula, $\alpha$ and $\beta$ each represent a positive integer).

10. The production method as described in 8 above, wherein the silicon nitride is at least one compound selected from the group consisting of $SiN$, $Si_2N_2$, $Si_2N_3$ and $Si_3N_4$.

11. The production method as described in any one of 1 and 3 to 10 above, wherein the primary powder of at least one member selected from a valve-acting metal, a valve-acting metal compound and a valve-acting metal alloy has an average particle size of 0.01 to 2 μm.

12. The production method as described in any one of 1 and 3 to 10 above, wherein the secondary aggregated powder of at least one member selected from a valve-acting metal, a valve-acting metal compound and a valve-acting metal alloy has an average particle size of 0.1 to 20 μm.

13. The production method as described in any one of 1 and 3 to 10 above, wherein the granulated powder of a primary powder or secondary aggregated powder of at least one member selected from a valve-acting metal, a valve-acting metal compound and a valve-acting metal alloy has an average particle size of 0.2 to 200 μm.

14. The production method as described in any one of 11 to 13 above, wherein the valve-acting metal, the valve-acting metal compound and the valve-acting metal alloy are respectively, niobium, niobium compound and niobium alloy.

15. The production method as described in any one of 1 to 14 above, wherein the pore-forming agent is an oxide which is present as a solid at the temperature of sintering the shaped article.

16. The production method as described in any one of 1 to 15 above, wherein the oxide is an oxide of an element of Groups 1 to 5 and 7-15 in the Periodic Table.

17. The production method as described in 15 above, wherein the oxide is an oxide of at least member selected from the group consisting of lithium, sodium, potassium, beryllium, magnesium, calcium, strontium, barium, scandium, yttrium, lanthanum, titanium, zirconium, hafnium, vanadium, rhenium, iron, ruthenium, cobalt, rhodium, iridium, nickel, copper, cadmium, mercury, boron, aluminum, gallium, indium, thallium, silicon, germanium, lead, antimony, bismuth, cerium, praseodymium, neodymium, samarium, europium, gadolinium, terbium, dysprosium, holmium, erbium, thulium, ytterbium and lutetium.

18. The production method as described in 15 above, wherein the compound of giving an oxide is at least one member selected from a group consisting of a hydroxide, a carbonate and a hydrogencarbonate.

19. The production method as described in any one of 1 to 15 above, wherein the pore-forming agent is at least one compound selected from the group consisting of sodium carbonate, sodium hydrogencarbonate, potassium carbonate, potassium hydrogencarbonate, lithium oxide, lithium carbonate, magnesium oxide, magnesium hydroxide, magnesium carbonate, magnesium hydrogencarbonate, calcium magnesium carbonate, calcium oxide, calcium hydroxide, calcium carbonate, barium oxide, barium carbonate, hafnium oxide, yttrium oxide, yttrium hydroxide, yttrium carbonate, lanthanum oxide, lanthanum hydroxide, lanthanum carbonate, cerium oxide, cerium hydroxide, cerium carbonate, neodymium oxide, neodymium hydroxide, neodymium carbonate, samarium oxide, samarium hydroxide, samarium carbonate, manganese carbonate, iron oxide, iron hydroxide, iron carbonate, iron magnesium oxide, iron lead oxide, barium zinc oxide, boron oxide, aluminum oxide, aluminum hydroxide, lead oxide and lead carbonate.

20. The production method as described in any one of 1 to 19 above, wherein the pore-forming agent used for the preparation of the granulated product is a powder particle having an average particle size of 0.1 to 100 µm.

21. The production method as described in 20 above, wherein the particle size distribution of the pore-forming agent has a plurality of peaks.

22. The production method as described in 21 above, wherein out of the plurality of peaks, at least one peak is present in the particle size of 0.1 to 1.0 µm and at least one peak is present in the particle size of 1.0 µm or more.

23. The production method as described in any one of 1 to 22 above, wherein the organic binder is at least one member selected from the group consisting of camphor, naphthalene, soap fatty acids, carbowax, vegetable wax, purified paraffin, acrylic polymers, methacrylic polymers, vinyl-based polymers and polyethylene carbonate.

24. The production method as described in any one of 1 to 23 above, wherein the step of removing the pore-forming agent is performed with at least one member selected from the group consisting of water, an organic solvent, an acidic solvent, an alkaline solvent, an amine solvent, an amino acid solvent, a polyphosphoric acid solvent, a crown ether solvent, a chelating solvent, an ammonium salt solvent and an ion exchange resin-dispersed solvent.

25. The production method as described in any one of 1 to 24 above, which further comprises a step of providing a valve-acting metal lead.

26. The production method as described in 25 above, wherein the step of providing a lead is performed by compressing and shaping the granulated product together with a valve-acting metal lead during the compression and shaping step, thereby implanting the valve-acting metal lead.

27. The production method as described in 25 above, wherein the step of providing a lead is performed by welding a valve-acting metal lead to the sintered body after the removing step.

28. The production method as described in 1 or 2 above, wherein the granulated product comprises a mixture containing a pore-forming agent, an organic binder and a primary powder or secondary aggregated powder of at least one member selected from a group consisting of valve-acting metal, a valve-acting metal compound and a valve-acting metal alloy or a granulated powder thereof, and the granulated product has an average particle size of 10 to 1,000 µm.

29. The production method as described in 1 or 2 above, wherein the granulated product comprises a mixture containing a pore-forming agent, an organic binder and a primary powder or secondary aggregated powder of at least one member selected from a group consisting of valve-acting metal, a valve-acting metal compound and a valve-acting metal alloy or a granulated powder thereof, and the granulated product has a repose angle of 60° or less.

30. The production method as described in 1 or 2 above, wherein the granulated product comprises a mixture containing a pore-forming agent, an organic binder and a primary powder or secondary aggregated powder of at least one member selected from a group consisting of valve-acting metal, a valve-acting metal compound and a valve-acting metal alloy or a granulated powder thereof, and the granulated product has a flowability of 0.1 $cm^3/g$ or more.

31. A granulated product comprising a mixture containing a pore-forming agent, an organic binder and a primary powder or secondary aggregated powder of at least one member selected from a group consisting of valve-acting metal, a valve-acting metal compound and a valve-acting metal alloy or a granulated powder thereof, wherein, in the ratio between the minor axis diameter and the major axis of the granulated product, the major axis value is 50 or less assuming that the minor axis value is 1.

32. The granulated product as described in 31 above, wherein the valve-acting metal compound and valve-acting metal alloy each contains at least one element selected from the group consisting of hydrogen, beryllium, magnesium, calcium, strontium, barium, scandium, yttrium, titanium, zirconium, hafnium, vanadium, tantalum, niobium, chromium, molybdenum, tungsten, manganese, rhenium, ruthenium, osmium, rhodium, iridium, palladium, platinum, silver, gold, zinc, cadmium, mercury, boron, aluminum, gallium, indium, thallium, carbon, silicon, germanium, tin, lead, nitrogen, phosphorus, arsenic, antimony, bismuth, oxygen, sulfur, selenium, tellurium, lanthanum, cerium, praseodymium, neodymium, samarium, europium, gadolinium, terbium, dysprosium, holmium, erbium, thulium, ytterbium and lutetium.

33. The granulated product as described in 31 or 32 above, wherein the valve-acting metal compound and valve-acting metal alloy each contains tantalum and niobium.

34. The granulated product as described in 31 or 32 above, wherein the valve-acting metal compound and valve-acting metal alloy each contains at least one element selected from the group consisting of niobium monoxide, silicon nitride and antimony.

35. The granulated product as described in 34 above, wherein the silicon nitride is a compound represented by $Si_\alpha N_\beta$ (in the formula, $\alpha$ and $\beta$ each represents a positive integer).

36. A sintered body of valve-acting metal, a valve-acting metal compound or a valve-acting metal alloy, which is used for the anode of a solid electrolytic capacitor, the sintered body having a volume of 10 mm$^3$ or more and a specific surface area of 0.005 m$^2$/mm$^3$ or more.

37. A sintered body of valve-acting metal, a valve-acting metal compound or a valve-acting metal alloy, which is used for the anode of a solid electrolytic capacitor, the sintered body having a volume of 10 mm$^3$ or more, a porosity of 55 vol % or more and a peak of 0.1 μm or more in the pore diameter distribution, with the volume of pores having a diameter of 1 μm or more being 10 vol % or more of the entire vacancy volume.

38. The sintered body as described in 36 or 37 above, wherein the pore diameter distribution has a plurality of peaks in the particle size of 0.3 μm or more.

39. The sintered body as described in any one of 36 to 38 above, wherein the volume of pores having a diameter of 1 μm or more is 13 vol % or more of the entire vacancy volume.

40. The sintered body as described in any one of 36 to 39 above, wherein the valve-acting metal compound or a valve-acting metal alloy each contains at least one element selected from the group consisting of hydrogen, beryllium, magnesium, calcium, strontium, barium, scandium, yttrium, titanium, zirconium, hafnium, vanadium, tantalum, niobium, chromium, molybdenum, tungsten, manganese, rhenium, ruthenium, osmium, rhodium, iridium, palladium, platinum, silver, gold, zinc, cadmium, mercury, boron, aluminum, gallium, indium, thallium, carbon, silicon, germanium, tin, lead, nitrogen, phosphorus, arsenic, antimony, bismuth, oxygen, sulfur, selenium, tellurium, lanthanum, cerium, praseodymium, neodymium, samarium, europium, gadolinium, terbium, dysprosium, holmium, erbium, thulium, ytterbium and lutetium.

41. A dispersion used in the production method as described in 1 above, comprising a mixture containing a pore-forming agent, an organic binder, a solvent and a primary powder or secondary aggregated powder of at least one member selected from a group consisting of valve-acting metal, a valve-acting metal compound and a valve-acting metal alloy or a granulated powder thereof, wherein the solid concentration is within a range of 1 to 80 mass %.

42. The dispersion as described in 41 above, comprising a viscosity of 0.1 Pa·s or more at 20° C.

43. The dispersion as described in 41 above, comprising a thixotropy index is within a range of 0.2 to 2 at 20° C.

44. A coated article obtained by a method involving a coating step using the dispersion as described in any one of 41 to 43 above.

45. A shaped article obtained by a method involving a step of molding the dispersion as described in any one of 41 to 43 above.

46. A shaped article obtained by compressing and shaping a granulated product of a mixture containing a pore-forming agent, an organic binder and a primary powder or secondary aggregated powder of at least one member selected from a group consisting of valve-acting metal, a valve-acting metal compound and a valve-acting metal alloy or a granulated powder thereof.

47. The shaped article as described in 46 above, wherein the valve-acting metal, the valve-acting metal compound and the valve-acting metal alloy are respectively, niobium, a niobium compound and a niobium alloy.

48. A sintered body comprising a pore-forming agent, which is obtained by sintering the coated article described in 44 above or the shaped article described in 45 to 47 above.

49. A niobium sintered body for use as the anode of a solid electrolytic capacitor, comprising no pore-forming agent, which is obtained by removing the pore-forming agent contained in the sintered body described in 48 above.

50. The niobium sintered body for use as the anode as described in any one of 36 to 40, 48 and 49 above, comprising a CV value of 40,000 to 400,000 μFV/g when sintered at 1,200° C.

51. A solid electrolytic capacitor comprising one electrode which is the sintered body for use as the anode of a solid electrolytic capacitor described in any one of 36 to 40, 48 and 49 above, a counter electrode and a dielectric material interposed between these electrodes.

52. The solid electrolytic capacitor as described in 51 above, wherein the main component of the dielectric material is niobium oxide or tantalum oxide.

53. The solid electrolytic capacitor as described in 51 or 52 above, wherein the material for the counter electrode is at least one member selected from the group consisting of an electrolytic solution, an organic semiconductor and an inorganic semiconductor.

54. The solid electrolytic capacitor as described in 53 above, wherein the material for the counter electrode is an organic semiconductor and the semiconductor is at least one member selected from the group consisting of an organic semiconductor comprising benzopyrroline tetramer and chloranil, an organic semiconductor mainly comprising tetrathiotetracene, an organic semiconductor mainly comprising tetracyanoquinodimethane, and an electrically conducting polymer.

55. The solid electrolytic capacitor as described in 54 above, wherein the organic semiconductor is an electrically conducting polymer and the electrically conducting polymer is at least one member selected from a group consisting of polypyrrole, polythiophene, polyaniline and substitution derivatives thereof.

56. The solid electrolytic capacitor as described in 55 above, wherein the electrically conducting polymer is an electrically conducting polymer obtained by doping a dopant into poly(3, 4-ethylenedioxythiophene).

57. The solid electrolytic capacitor as described in any one of 54 to 56 above, wherein the material for the counter electrode has a layered structure at least in a part of the material.

58. An electronic circuit using the solid electrolytic capacitor as described in any one of 51 to 57 above.

59. An electronic device using the solid electrolytic capacitor as described in any one of 51 to 57 above.

60. A device using the solid electrolytic capacitor as described in any one of 51 to 57 above, which is an oscillator-installed device, an IC-mounted device, a CPU-mounted device or an electric source device.

61. The production method as described in 6 above, wherein the valve-acting metal compound or a valve-acting metal alloy each contains at least one element selected from the group consisting of hydrogen, yttrium, zirconium, hafnium, vanadium, tantalum, niobium, molybdenum, tungsten, manganese, rhenium, zinc, boron, aluminum, silicon, nitrogen, antimony, oxygen, neodymium, erbium, ytterbium and lutetium.

62. The production method as described in 61 above, wherein the valve-acting metal compound or a valve-acting metal alloy each contains silicon and nitrogen.

63. The granulated product as described in 32 above, wherein the valve-acting metal compound or a valve-acting metal alloy each contains at least one element selected from the group consisting of hydrogen, yttrium, zirconium, hafnium, vanadium, tantalum, niobium, molybdenum, tungsten, manganese, rhenium, zinc, boron, aluminum, silicon, nitrogen, antimony, oxygen, neodymium, erbium, ytterbium and lutetium.

64. The granulated product as described in 63 above, wherein the valve-acting metal compound or a valve-acting metal alloy each contains at least one element selected from the group consisting of tantalum, niobium, silicon, nitrogen, antimony and oxygen.

65. The sintered body as described in 40 above, wherein the valve-acting metal compound or a valve-acting metal alloy each contains at least one element selected from the group consisting of hydrogen, yttrium, zirconium, hafnium, vanadium, tantalum, molybdenum, tungsten, manganese, rhenium, zinc, boron, aluminum, silicon, nitrogen, antimony, oxygen, neodymium, erbium, ytterbium and lutetium 66. The solid electrolytic capacitor as described in 55 above, wherein the electrically conducting polymer is an electrically conducting polymer obtained by doping a dopant into a polymer containing a repeating unit represented by the following formula (1) or (2):

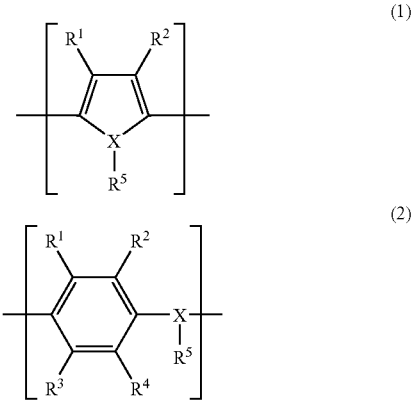

wherein $R^1$ to $R^4$ each independently represents a monovalent group selected from a group consisting of hydrogen atom, a linear or branched, saturated or unsaturated alkyl, alkoxy or alkyl ester group having from 1 to 10 carbon atoms, a halogen atom, a nitro a $CF_3$ group, a phenyl group and a substituted phenyl group, the hydrocarbon chains of $R^1$ and $R^2$, or $R^3$ and $R^4$ may combine with each other at an optional position to form a divalent group for forming at least one 3-, 4-, 5-, 6- or 7-membered saturated or unsaturated hydrocarbon cyclic structure together with the carbon atoms to which those groups are substituted, the cyclic combined chain may contain, at an arbitrary position thereof, a carbonyl bond, an ether bond, an ester bond, an amide bond, a sulfide bond, a sulfinyl bond, a sulfonyl bond or an imino bond, X represents an oxygen atom, a sulfur atom or a nitrogen atom, and $R^5$ is present only when X is a nitrogen atom, and independently represents a hydrogen atom or a linear or branched, saturated or unsaturated alkyl group having from 1 to 10 carbon atoms.

67. The solid electrolytic capacitor as described in 66 above, wherein the electrically conducting polymer is an electrically conducting polymer containing a repeating unit represented by the following formula (3):

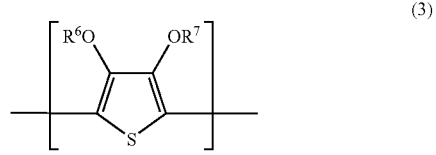

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position, and the cyclic structure includes a structure having a vinylene bond which may be substituted, and a phenylene structure which may be substituted.

68. The electrolytic capacitor as described in any one of 54 to 57, 66 and 67 above, wherein material for a counter electrode contains organic sulfonic acid anion as dopant.

DETAILED DESCRIPTION OF INVENTION

The present invention is described in detail below.

[1] Granulated Product

The granulated product for use in the production of a sintered body of the present invention comprises a mixture containing a pore-forming agent, an organic binder and a primary powder or secondary aggregated powder of at least one member selected from valve-acting metal, a valve-acting metal compound and a valve-acting metal alloy or a granulated powder thereof (hereinafter, these are sometimes referred to as a "valve-acting metal powder" or a "valve-acting metal powder for capacitors").

The valve-acting metal, valve-acting metal compound and valve-acting metal alloy for use in the present invention mean a substance mainly comprising niobium or tantalum and usable as a material for the production of a capacitor. This substance may be pure niobium, pure tantalum, an alloy of niobium or tantalum with another component, or an electrically conducting (including semiconductor) niobium or tantalum compound containing a component such as nitrogen (50 to 50,000 ppm) and/or oxygen (2,000 to 200,000 ppm). When niobium is used, the electrically conducting (including semiconductor) niobium compound containing nitrogen and/or oxygen may be diniobium monoxide, niobium monoxide and/or hexaniobium monoxide. These compounds may be amorphous or in any form of noncrystalline, glass, colloid, crystal and the like. Also, these compound may be a hydride of pure niobium, pure tantalum, niobium alloy, tantalum alloy, niobium compound or tantalum compound.

The component other than valve-acting metal in the valve-acting metal alloy or valve-acting metal compound is at least one element selected from the group consisting of hydrogen, beryllium, magnesium, calcium, strontium, barium, scandium, yttrium, titanium, zirconium, hafnium, vanadium, tantalum, niobium, chromium, molybdenum, tungsten, manganese, rhenium, ruthenium, osmium, rhodium, iridium, palladium, platinum, silver, gold, zinc, cadmium, mercury, boron, aluminum, gallium, indium, thallium, carbon, silicon, germanium, tin, lead, nitrogen, phosphorus, arsenic, antimony, bismuth, oxygen, sulfur, selenium, tellurium, lanthanum, cerium, praseodymium, neodymium, samarium, europium, gadolinium, terbium, dysprosium, holmium, erbium, thulium, ytterbium and lutetium, preferably at least one element selected from the group consisting of hydrogen, yttrium, zirconium, hafnium, vanadium, tantalum, niobium, molybdenum, tungsten, manganese, rhenium, zinc, boron, aluminum, silicon, nitrogen, phosphorus, antimony, oxygen, neodymium, erbium, ytterbium and lutetium. These compounds may be amorphous or in any form of noncrystalline, glass, colloid, crystal and the like. In order to obtain a valve-acting metal powder for capacitor having a higher capacitance and a lower ESR, it is preferable that the valve-acting metal alloy and the valve-acting metal compound contain at least one element selected from a group consisting of nitrogen, oxygen, tantalum, antimony and silicon. In a case of niobium compound containing nitrogen and silicon, the compound may be silicon nitride. Examples of silicon nitride include SiN, $Si_2N_2$, $Si_2N_3$ and $Si_3N_4$, which may be amorphous or in any form of noncrystalline, glass, colloid, crystal and the like.

The valve-acting metal powder which can be used in the production method of the present invention may be a primary powder, a secondary aggregated powder resulting from aggregation of primary powder, or a granulated powder obtained by granulating the primary powder or secondary aggregated powder. The primary powder preferably has an average particle size of 0.01 to 2 μm, the secondary aggregated powder preferably has an average particle size of 0.1 to 20 μm, and the granulated powder preferably has an average particle size of 0.2 to 200 μm. The valve-acting metal powder can be suitably used irrespective of the shape such as spherical form, bar-like form, flat form and flake form. In order to obtain a valve-acting metal sintered body for capacitors having higher capacitance, the valve-acting metal powder used preferably has less heat history and a large specific surface area.

Such a valve-acting metal powder can be produced by a known method such as a production method described, for example, in U.S. Pat. No. 4,084,965, JP-A-10-242004 and JP-A-2002-25864, where a niobium powder, a niobium compound powder or a niobium alloy powder is produced by grinding, and a production method described, for example, in U.S. Pat. Nos. 1,728,941 and 4,687,632 and JP-A-2000-119710, where a niobium powder is produced by the reduction of a niobium oxide or a niobium halide.

The pore-forming agent for use in the present invention is preferably a substance which does not react with the above-described valve-acting metal, valve-acting metal compound or valve-acting metal alloy before or during the later sintering step and is present as a solid at the sintering temperature (usually 700° C. or more). Specifically, the pore-forming agent is preferably a compound of giving an oxide or giving an oxide through the sintering step. By using a pore-forming agent which is present as a solid at the sintering temperature, excessive aggregation of the valve-acting metal powder can be blocked at the sintering and valve-acting metal powder particles can be caused to fuse together only at the point of valve-acting metal powder particles contacting with each other. A pore-forming agent which becomes a liquid or a gas at the sintering temperature can also be used, but in this case, the effect of blocking the aggregation of valve-acting metal powder decreases and pores smaller than the desired size may be formed.

When excessive aggregation of the valve-acting metal powder is blocked, the density of the sintered body can be controlled to be optimal for the impregnation of the cathode material at the production of a capacitor and the sintered body can be made to have a large specific area and a large capacitance per unit volume.

Examples of the pore-forming agent include oxides of lithium, sodium, potassium, beryllium, magnesium, calcium, strontium, barium, scandium, yttrium, lanthanum, titanium, zirconium, hafnium, vanadium, rhenium, iron, ruthenium, cobalt, rhodium, iridium, nickel, copper, cadmium, mercury, boron, aluminum, gallium, indium, thallium, silicon, germanium, lead, antimony, bismuth, cerium, praseodymium, neodymium, samarium, europium, gadolinium, terbium, dysprosium, holmium, erbium, thulium, ytterbium and lutetium, and hydroxides, carbonates and hydrogencarbonates giving such an oxide. These compounds can be used individually or in combination of two or more thereof.

In the present invention, the pore-forming agent after the sintering step includes an oxide formed by the sintering from the pore-forming agent used at the production of the shaped article.

The pore-forming agent is removed by a solvent in a step after the sintering and therefore, preferably has good solubility in a solvent. Furthermore, since the pore-forming agent is dissolved and removed, an inexpensive pore-forming agent is economically advantageous. Therefore, particularly preferred examples of pore-forming agent include sodium carbonate, sodium hydrogencarbonate, potassium carbonate, potassium hydrogencarbonate, lithium oxide, lithium carbonate, magnesium oxide, magnesium hydroxide, magnesium carbonate, magnesium hydrogencarbonate, calcium magnesium carbonate, calcium oxide, calcium hydroxide, calcium carbonate, barium oxide, barium carbonate, hafnium oxide, yttrium oxide, yttrium hydroxide, yttrium carbonate, lanthanum oxide, lanthanum hydroxide, lanthanum carbonate, cerium oxide, cerium hydroxide, cerium carbonate, neodymium oxide, neodymium hydroxide, neodymium carbonate, samarium oxide, samarium hydroxide, samarium carbonate, manganese carbonate, iron oxide, iron hydroxide, iron carbonate, iron magnesium oxide, iron lead oxide, barium zinc oxide, boron oxide, aluminum oxide, aluminum hydroxide, lead oxide and lead carbonate.

The particle size of the pore-forming agent affects the pore diameter of the sintered body of the present invention, and the pore diameter of the sintered body affects the capacitance of a capacitor and the impregnation with the cathode material in the production step of a capacitor. When good impregnation with the cathode material is obtained, a capacitor having a high capacitance and a low ESR can be obtained. Particularly in the case where the sintered body for use as the anode of a capacitor is a large sintered body having a thickness of 1 mm or more in the thinnest portion and a volume of 10 mm$^3$ or more, the impregnation property determines the properties of the capacitor. A sintered body having a small peak in the pore diameter distribution is not sufficiently impregnated with the cathode material. Therefore, the pore diameter of the valve-acting metal sintered body for capacitors is, in terms of the average diameter, preferably 0.1 μm or more, more preferably 0.3 μm or more. Particularly, in a large valve-acting metal sintered body for use as the anode of a capacitor, having a volume of 10 mm$^3$ or more and a porosity of 55 vol % or more, the total volume of pores having a diameter of 1 μm or more is preferably 10 vol % or more of the entire vacancy volume. It is more preferred that the pore diameter distribution has a plurality of peaks in the particle size of 0.3 μm or more and the total volume of pores having a diameter of 1 μm or more is 13 vol % or more of the entire vacancy volume.

As described above, the pore-forming agent is present as a solid at the sintering temperature and removed by an appropriate solvent and therefore, the average pore diameter of the sintered body of the present invention is almost the same as the average particle size of the pore-forming agent. Accordingly, the average particle size of the pore-forming agent is preferably from 0.1 to 100 μm, more preferably from 0.5 to 20 μm. In the case of using only one pore-forming agent having an average particle size of 1.0 μm or less, the distribution of 1 μm or more in the particle size distribution of the pore-forming agent preferably occupies 10 vol % or more.

A plurality of pore-forming agents differing in the average particle size may also be mixed and used as a pore-forming agent having a plurality of peaks in the particle size distribution. More specifically, when a pore-forming agent having an average particle size of 0.1 to 1 μm, preferably from 0.3 to 1 μm, and a pore-forming agent having an average particle size of 1 μm or more, preferably from 1 to 20 μm, more preferably from 1 to 5 μm, are used in combination, the impregnation of the cathode material into the anode sintered body is enhanced. These pore-forming agents having different average particle sizes may be further mixed with a plurality of pore-forming agents differing in the average particle size. Even when a plurality of pore-forming agents differing in the average particle size are used in combination, those having a particle size of 1 μm or more preferably occupy 10 vol % or more, more preferably from 13 to 80 vol % or more, still more preferably from 15 to 50 vol %, in the pore-forming agent mixture. For example, in order to obtain a sintered body where the pore diameter distribution has peaks at 0.7 μm and 2 μm and the volume of pores having a diameter of 1 μm or more occupies 13 vol % or more of the entire pore volume, this may be attained by using pore-forming agents having an average particle size of about 0.7 μm and about 2 μm in combination and setting the proportion of the pore-forming agent having an average particle size of 2 μm to 13 vol % or more.

The amount added of the pore-forming agent based on valve-acting metal is related to the density of shaped article and the density of sintered body. In view of easy impregnation with the cathode material and strength of the sintered body, the density of the sintered body of the present invention is, for niobium, preferably from 2.5 to 4.0 g/ml, more preferably from 2.8 to 3.8 g/ml, still more preferably from 3.0 to 3.6 g/ml, and for tantalum, preferably from 4.5 to 7.8 g/ml, more preferably from 4.8 to 7.3 g/ml, still more preferably from 5.0 to 6.8 g/ml. By taking account that the shaped article shrinks by baking, the density of shaped article (the density of shaped article of the above-described valve-acting metal, valve-acting metal compound, valve-acting metal alloy or the like excluding the pore-forming agent, binder and lead wire) is, in term of niobium, preferably from 2.0 to 3.8 g/ml, more preferably from 2.5 to 3.6 g/ml, still more preferably from 2.8 to 3.4 g/ml, and in term of tantalum, preferably from 4.0 to 7.5 g/ml, more preferably from 4.5 to 7.0 g/ml, still more preferably from 4.8 to 6.3 g/ml.

The amount of the pore-forming agent added may be selected to give a sintered body density falling in the above-described range. Although this varies depending on the molecular weight, shape, average particle size, bulk density and tapping density of the pore-forming agent, the usual amount added is preferably 70 mass % or less, more preferably 50 mass % or less, based on the total amount of the valve-acting metal powder and the pore-forming agent.

In the present invention, the binder used in the mixture containing a valve-acting metal powder, a pore-forming agent and a binder may be a known organic binder. Examples of the binder which can be used include camphor, naphthalene, soap fatty acids such as stearic acid, carbowax, vegetable wax, purified paraffin, acrylic polymers such as polyacrylic acid, polyacrylic acid ester and polyacrylamide, methacrylic polymers such as polymethacrylic acid, polymethacrylic acid ester and polymethacrylamide, vinyl-based polymers such as polyvinyl alcohol, polyvinyl butyral and polyvinyl acetate, and polyethylene carbonate. This binder is usually used after dissolving it in a solution. Examples of the solvent which can be used include water, alcohols, ethers, cellosolves, ketones, aliphatic hydrocarbons, aromatic hydrocarbons and halogenated hydrocarbons.

The amount of the organic binder used varies depending on the kind and cannot be indiscriminately specified but assuming that the total of the valve-acting metal powder and the pore-forming agent is 100 parts by mass, the amount of the organic binder used is usually from 1 to 15 parts by mass, preferably from 3 to 10 parts by mass, more preferably from 4 to 8 parts by mass.

In the present invention, the granulated product comprising a mixture of a valve-acting metal powder, a pore-forming agent and a binder can be produced, for example, as follows.

The valve-acting metal powder for capacitors, the pore-forming agent and the organic binder are charged in a solvent (e.g., toluene) and thoroughly mixed. For the mixing, a mixer may be used. As the mixer, a normal device such as shaking mixer, V-type mixer, bead mixer and Nauter mixer can be used without problems. The temperature at the mixing is limited by the boiling point and solidifying point of the solvent but is generally from −50 to 120° C., preferably from −50 to 50° C., more preferably from −10 to 30° C. The time spent for the mixing is not particularly limited as long as it is 5 minutes or more, but the mixing time is usually from 1 to 6 hours. The mixing is preferably performed in an oxygen-free atmosphere by using an inert gas such as nitrogen and argon. Thereafter, the mixture is granulated while removing the solvent by distillation.

For the removal of solvent by distillation, a dry granulating machine can be used. Examples of the dry granulating machine include a conical drier, a fluidized drier, Nauter mixer and Henschel mixer. The removal of solvent by distillation is performed at a temperature from ordinary temperature to 200° C. under an appropriate pressure from reduced pressure to applied pressure, though this varies depending on the boiling point of the solvent used. In general, the removal of solvent by distillation is preferably performed at a temperature from ordinary temperature to 120° C. under reduced pressure.

In the present invention, the granulated product preferably has an average particle size of 10 to 1,000 μm, more preferably from 15 to 500 μm, still more preferably from 20 to 300 μm.

The mixture may be prepared by individually using the valve-acting metal powder and the pore-forming agent as described above. Alternately, the valve-acting metal power and the pore-forming agent may be previously mixed and granulated and thereafter, the mixture may be prepared by using the organic binder. In the case of previously mixing and granulating the valve-acting metal powder and the pore-forming agent, for example, the valve-acting metal powder and the pore-forming agent are charged in an organic solvent such as toluene, then mixed, granulated and dried by using the above-described mixer and dry granulating machine to prepare a dispersion. The obtained may be used for coating or printing. The solid concentration of the dispersion is preferably within a range of 1 to 80 mass %, more preferably 1 to 50 mass %.

Also, the viscosity of the dispersion is measured according to a measuring method described in JIS Z 8803, and the measurement may be preformed with any viscometer generally used such as a B-type or E-type viscometer. The viscosity of the dispersion is preferably 0.1 Pa·s or more at 20° C., more preferably 0.2 Pa·s. The thixotropy index is preferably within a range of 0.2 to 2, more preferably 0.3 to 1.6.

After granulating and drying the dispersion, a mixture using the dispersion can be obtained by heating the dispersion at a temperature of 300 to 1,700° C. under an appropriate pressure for 1 minute to 100 hours. At this time, an inorganic or organic binder may be used. The heat history (temperature, time, number of operations) incurs reduction in the specific surface area of the sintered body, though this may vary depending on the temperature, as a result, the capacitance decreases. Therefore, less heat history is preferred.

In the present invention, a step of doping the valve-acting metal powder or granulated product before the formation into a shaped article, with at least one element selected from the group consisting of nitrogen, boron, phosphorus, sulfur, selenium and tellurium may be provided. Examples of the method for doping with nitrogen include gas nitridation, ion nitridation and solid nitridation. Among these, gas nitridation is preferred because nitrogen can be uniformly doped on the surface of valve-acting metal particle. The doping may also be applied to the shaped article before sintering or may be performed after sintering but before the step of removing the pore-forming agent, or after the step of removing the pore-forming agent.

[2] Shaped Article

In the present invention, "shaping" means a method of printing or coating with the dispersion, or a method of press-shaping the granulated product comprising a mixture of a valve-acting metal powder. Also, the "shaped article" means an article shaped by the above methods.

As shaping method by printing or coating with the dispersion, roll-coating method using a doctor blade or squeeze coating, screen printing method using a metal mask or any known printing method such as a relief printing method where the dispersion is printed on a substrate material, shaping method by pouring the dispersion into a mold (pillow shaping or slip casting) or the like may be employed. An article shaped by using these method can be as thin as 1 mm or less, further a shaped article can have a thinness of 600 μm or less.

In the present invention, the shaped article comprising a granulated product consisting of a valve-acting metal powder, a pore-forming agent and a binder (hereinafter this shaped article is sometimes simply referred to as a "shaped article") can be produced preferably by using an automatic shaping machine. More specifically, the granulated product is weighed while naturally dropping it to a die from a hopper of the automatic shaping machine and shaped together with a lead wire. A granulated product not having appropriate flowability or repose angle hardly flows from the hopper to the die and cannot be stably shaped, which causes a wide variety in the mass of the shaped article or in the strength or shape of the sintered body, and also sometimes causes chipping, cracking or deterioration of the leakage current. If the average particle size of the granulated product is less than 10 μm, bad flowability results, whereas if it exceeds 1,000 μm, some variety is caused in the amount of the granulated product filled into corner parts of the die. Accordingly, as described above, the average particle size of the granulated product is preferably from 10 to 1,000 μm, more preferably from 15 to 500 μm, still more preferably from 20 to 300 μm. The granulated product for use in the present invention preferably has a repose angle of 60° or less, more preferably from 10 to 50°, as measured by the gradient method. In the present invention, with respect to flowability of the granulated product (measured according to a JIS Z2504 method), the more volume flows per unit time, the more preferable. Generally, the flowability is preferably 0.1 cm$^3$/s or more, more preferably 0.2 cm$^3$/s or more, still more preferably 0.3 cm$^3$/s or more. If the granulated product has a good flowability, the granulated product can be preferably used regardless of its form such as sphere, bar, flat and flake. Generally, the form is preferably sphere or bar. With respect to the ratio between the minor axis diameter and major axis diameter of the granulated product, assuming that the minor axis diameter is 1, the major axis diameter is preferably 50 or less, more preferably 10 or less, still more preferably 5 or less.

It may be also possible to produce the shaped article without using a lead wire and weld a lead wire to the pore-forming agent-containing sintered body after sintering or to the sintered body after sintering and removal of the pore-forming agent. For the welding, spot welding is preferably used. The lead wire is suitably valve-acting tantalum, niobium or aluminum, or a compound or alloy thereof. In view of adhesion to the valve-acting metal powder after sintering, a partially nitrided valve-acting metal or a valve-acting metal alloy is preferred, and a valve-acting metal lead wire having the same composition as the valve-acting metal powder of the present invention is more preferred. That is, for example, a partially nitrided niobium lead wire is preferably used when a partially nitrided niobium powder is used, and a niobium alloy lead wire is preferably used when a niobium alloy powder is used.

[3] Sintering

The resulting shaped article is subjected to sintering. The sintering is performed by heating the shaped article at 700 to 2,000° C. for 1 minute to 100 hours under highly reduced pressure (for example, from $10^{-4}$ to $10^{-1}$ Pa) in the presence of an inert gas such as argon and helium, though the sintering conditions vary depending on the melting point and boiling point of the pore-forming agent used, and/or the melting point and boiling point of valve-acting metal powder, valve-acting metal compound or valve-acting metal alloy used. The sintering temperature is preferably from 800 to 1,500° C., more preferably from 1,000 to 1,300° C.

A step of removing the organic binder before the temperature reaches the sintering temperature may also be provided. The organic binder can be removed, for example, by treating the shaped article at a temperature lower than the sintering temperature, that is, at a temperature of 200 to 600° C., for 10 minutes to 10 hours under reduced pressure (from $10^1$ to $10^3$ Pa). When the step of removing the organic binder is provided before the sintering, the organic binder can be more completely removed.

In the case where a hydride of valve-acting metal, valve-acting metal compound or valve-acting metal alloy is used as the valve-acting metal powder, a step of removing hydrogen may be provided during or before the sintering step. The removal of hydrogen (dehydrogenation) can be performed, for example, by treating the shaped article at 300 to 600° C. for 10 minutes to 100 hours under reduced pressure (from $10^1$ to $10^3$ Pa).

After the completion of sintering, the sintered body is cooled until the temperature of the valve-acting metal sintered body (sometimes simply referred to as "product temperature") becomes 30° C. or less. Thereto, an inert gas (e.g., nitrogen, argon) containing from 0.01 to 10 vol %, preferably from 0.1 to 1 vol %, of oxygen is gradually added while keeping the product temperature 30° C. or less and in this state, the sintered body is left standing for 8 hours or more and then taken out.

[4] Removal of Pore-Forming Agent

After sintering, the pore-forming agent contained in the sintered body is removed and thereby the valve-acting metal sintered body for use as the anode of a capacitor of the present invention is produced. The method for removing the pore-forming agent includes a method where the pore-forming agent is dissolved in a solvent and thereby removed. The solvent used may be sufficient if the pore-forming agent to be dissolved has sufficiently high solubility in the solvent. An inexpensive solvent which scarcely remains with the sintered body is preferred.

For example, when the pore-forming agent is water-soluble, water can be used as the solvent. When the pore-forming agent is organic solvent-soluble, an organic solvent can be used as the solvent. Examples of the organic solvent which can be used include alcohols such as methanol and ethanol, ketones such as acetone and methyl isobutyl ketone, and dimethylsulfoxide (DMSO).

When the pore-forming agent is acid-soluble, an acidic solvent such as nitric acid, sulfuric acid, phosphoric acid, boric acid, carbonic acid, hydrofluoric acid, hydrochloric acid, hydrobromic acid, hydroiodic acid and organic acid can be used as the solvent.

When the pore-forming agent is alkali-soluble, an alkaline solvent such as hydroxide of alkali metal, hydroxide of alkaline earth metal, and ammonia can be used as the solvent.

When the pore-forming agent forms a soluble complex, a solution of the ligand therefor such as amines (e.g., ammonia, ethylenediamine), amino acids (e.g., glycine), polyphosphoric acids (e.g., sodium tripolyphosphate), crown ethers, thiosulfates (e.g., sodium thiosulfate) and chelating agents (e.g., ethylenediaminetetraacetic acid) can be used as the solvent.

Also, a solution of ammonium salt such as ammonium chloride, ammonium nitrate and ammonium sulfate, a cation exchange resin, an anion exchange resin and the like can be suitably used.

In the case of removing the pore-forming agent by a solvent, examples of the combination of a pore-forming agent and a solvent include barium oxide and water, calcium carbonate and hydrochloric acid, aluminum oxide and an aqueous sodium hydroxide solution, hafnium oxide and methyl isobutyl ketone, and magnesium carbonate and an aqueous tetrasodium ethylenediaminetetraacetate solution.

The temperature at the time of dissolving and removing the pore-forming agent is preferably low. The valve-acting metal has high affinity for oxygen and if the temperature at the dissolution and removal is high, the valve-acting metal surface is oxidized. Accordingly, the temperature at the dissolution and removal is preferably 50° C. or less, more preferably from −10 to 40° C., still more preferably from 0 to 30° C. Because of the same reason, a method of less generating heat at the dissolution and removal is preferably selected. For example, when a metal oxide or a metal carbonate is used as pore-forming agent, a method of dissolving and removing the pore-forming agent with an acid is disadvantageous because neutralization heat or the like is generated. Therefore, a method of less generating heat, for example, a method of dissolving the pore-forming agent in water or an organic solvent, a method of forming a soluble complex by using an aqueous ammonium nitrate solution or ethylenediaminetetraacetic acid, or a method of dissolving the pore-forming agent in a solution containing an ion exchange resin, is preferably selected.

After the pore-forming agent is removed by using such a solvent, the sintered body is thoroughly washed to remove the solvent. For example, when the pore-forming agent is removed by using nitric acid or ammonium chloride as the solvent and the nitric acid or ammonium chloride solvent is washed and removed with ion exchanged water, the washing is preferably continued until the electric conductivity of the ion exchanged water used for the washing becomes 5 µS/cm or less. After thorough washing, the sintered body is dried at 120° C. or less, preferably 80° C. or less, more preferably 50° C. or less, under an appropriate pressure. Drying under reduced pressure is preferred because a short drying time and a low drying temperature can be used. After the completion of drying, oxidization is allowed to gradually proceed and thereby the sintered body of the present invention is obtained.

The sintered body produced by the production method of the present invention has a pore diameter distribution suitable for the impregnation of the cathode material, where the peak top is present in the range from 0.01 to 100 µm. Needless to say about a small sintered body having a volume of less than 10 mm$^3$, also in the case of a large sintered body having a thickness of 1 mm or more in the thinnest portion of the sintered body and a volume of 10 mm$^3$ or more, the pore peak top can be adjusted to be present in the range of 0.3 µm or more, even in the range of 0.5 µm or more.

Furthermore, in a large sintered body having a volume of 10 mm$^3$ or more and a porosity of 55 vol % or more, the volume of pores having a diameter of 1 µm or more can be adjusted to occupy 10 vol % or more of the entire vacancy volume and the pore diameter distribution can be adjusted to have a plurality of peaks in the range of 0.3 µm or more, even in the range of 0.5 µm or more. The volume of pores having a diameter of 1 µm or more can also be adjusted to 13 vol % or more of the entire vacancy volume.

The density of the sintered body obtained by the production method of the present invention is usually 4.0 g/ml or less in a case where niobium is used as the valve-acting metal, and 8.0 g/ml or less in a case where tantalum is used as the valve-acting metal. When the density is 4.0 g/ml or less in case of niobium or 8.0 g/ml or less in case of tantalum, good impregnation property is obtained, though this varies depending on the kind of the cathode material. For example, when a high-capacitance niobium powder having a CV value of 200,000 µFV/g is adjusted to give a shaped article having a density of 2.8 g/ml and a volume of 25 mm$^3$ and sintered at 1,150° C. according to the method of the present invention, the sintered body has a volume of about 22 mm$^3$, a density of 3.2 g/ml and a specific surface area of 0.17 m$^2$ (0.0077 m$^2$/mm$^3$). If a pore-forming agent is not used, the sintering excessively proceeds and the sintered body becomes to have a volume of about 17 mm$^3$, a density of 4.2 g/ml and a specific surface area of 0.10 m$^2$ (0.0059 m$^2$/mm$^3$).

When the density of the sintered body is increased, impregnation of the cathode material becomes more difficult and the capacitance realization ratio in a capacitor decreases, and when the specific surface area is decreased, the capacitance of the sintered body decreases. If the method of not using a pore-forming agent is employed, even when a high-capacitance niobium powder of 200,000 µF/g is used, the obtained capacitor can have a capacitance of only about 400 µF/unit (sintered body of about 20 mm$^3$).

When the method of the present invention is used, high capacitance realization ratio and high capacitance of sintered body can be achieved at the same time and a capacitor of about 750 µF/unit (sintered body of about 20 mm$^3$) can be produced. When a primary powder having less heat history as described above is used, sintering can be performed at a lower temperature, as a result, a sintered body (about 20 mm$^3$) having a capacitance of 800 µF/unit or more, even 1,000 µF/unit or more, can be produced.

When a sintered body of 10 mm³ is produced by the method of the present invention, the specific surface area is 0.005 m²/mm³ or more and when a primary powder having less heat history as described above is used, the specific surface area can be increased to 0.01 m²/mm³ or more. Furthermore, even if the volume of the sintered body is increased to 50 mm³ and 100 mm³, the impregnation ratio of the cathode material does not greatly decrease and ESR is stable.

For example, when the sintered body of the present invention is obtained by sintering at 1,200° C., the CV value (a product of the electrochemical forming voltage value at the electrochemical formation at 80° C. for 120 minutes in an aqueous 0.1 mass % phosphoric acid solution, and the capacitance at 120 Hz) becomes from 40,000 to 400,000 μFV/g.

[5] Capacitor Element

The production of a capacitor element is described below.

A capacitor can be produced from the sintered body described above, which is used as one electrode, a counter electrode and a dielectric material intervening between the electrodes. For example, the niobium sintered body is used as one electrode, a dielectric material is formed on the surface (including surfaces in pores) of the sintered body and a counter electrode is provided on the dielectric material, thereby fabricating a capacitor.

The dielectric material of the capacitor is preferably a dielectric material mainly comprising niobium oxide, more preferably a dielectric material mainly comprising niobium pentoxide. The dielectric material mainly comprising niobium pentoxide can be obtained, for example, by electrochemically forming the niobium sintered body used as one electrode. The niobium electrode is electrochemically formed in an electrolytic solution usually by using an aqueous protonic acid solution, for example, an aqueous 0.1% phosphoric acid solution, an aqueous sulfuric acid solution, an aqueous 1% acetic acid solution or an aqueous adipic acid solution. When a niobium oxide dielectric material is obtained in this way by electrochemically forming the niobium electrode in an electrolytic solution, the capacitor of the present invention is an electrolytic capacitor and the niobium electrode serves as the anode.

In the capacitor of the present invention, the counter electrode of the niobium sintered body is not particularly limited and, for example, at least one material (compound) selected from a group consisting of electrolytic solutions, organic semiconductors and inorganic semiconductors known in the industry of aluminum electrolytic capacitor can be used.

Specific examples of the electrolytic solution include a dimethylformamide and ethylene glycol mixed solution having dissolved therein 5 mass % of isobutyltripropylammonium borotetrafluoride electrolyte, and a propylene carbonate and ethylene glycol mixed solution having dissolved therein 7 mass % of tetraethylammonium borotetrafluoride.

Specific examples of the organic semiconductor include an organic semiconductor comprising benzopyrroline tetramer and chloranil, an organic semiconductor mainly comprising tetrathiotetracene, an organic semiconductor mainly comprising tetracyanoquinodimethane, and an electrically conducting polymer containing a repeating unit represented by the following formula (1) or (2):

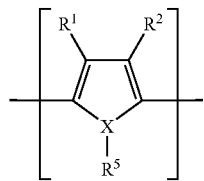

(1)

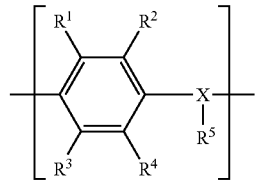

(2)

wherein $R^1$ to $R^4$ each independently represents a monovalent group selected from a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a $CF_3$ group, a phenyl group and a substituted phenyl group; the hydrocarbon chains of $R^1$ and $R^2$, or $R^3$ and $R^4$ may combine with each other at an optional position to form a divalent group for forming at least one 3-, 4-, 5-, 6- or 7-membered saturated or unsaturated hydrocarbon cyclic structure together with the carbon atoms to which those groups are substituted; the cyclic combined chain may contain, at an arbitrary position thereof, a carbonyl bond, an ether bond, an ester bond, an amide bond, a sulfide bond, a sulfinyl bond, a sulfonyl bond or an imino bond; X represents an oxygen atom, a sulfur atom or a nitrogen atom; and $R^5$ is present only when X is a nitrogen atom, and independently represents a hydrogen atom or a linear or branched, saturated or unsaturated alkyl group having from 1 to 10 carbon atoms.

In the present invention, $R^1$ to $R^4$ in formulae (1) and (2) each independently represents preferably a hydrogen atom or a linear or branched, saturated or unsaturated alkyl or alkoxy group having from 1 to 6 carbon atoms, and each of the pairs $R^1$ and $R^2$, and $R^3$ and $R^4$ may combine with each other to form a ring.

In the present invention, the electrically conducting polymer containing a repeating unit represented by formula (1) is preferably an electrically conducting polymer containing the structural unit represented by the following formula (3) as a repeating unit:

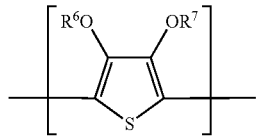

(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position; and the cyclic structure includes a structure having a vinylene bond which may be substituted, and a phenylene structure which may be substituted.

The electrically conducting polymer containing such a chemical structure is doped with a dopant. For the dopant, known dopants can be used without limitation.

Examples of the polymer containing a repeating unit represented by formula (1) or (2) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxythiophene)).

Specific examples of the inorganic semiconductor include an inorganic semiconductor mainly comprising lead dioxide or manganese dioxide, and an inorganic semiconductor comprising triiron tetroxide. These semiconductors may be used individually or in combination of two or more thereof.

When the organic or inorganic semiconductor used has an electric conductivity of $10^{-2}$ to $10^3$ S/cm, the capacitor produced can be more reduced in the impedance value and more increased in the capacitance at a high frequency.

The electrically conducting polymer layer is produced, for example, by a method of polymerizing a polymerizable compound such as aniline, thiophene, furan, pyrrole, methylpyrrole or a substitution derivative thereof, under the action of an oxidizing agent capable of causing a satisfactory oxidation reaction (dehydrogenative 2 electron oxidation). The polymerization reaction from a polymerizable compound (monomer) includes, for example, vapor phase polymerization and solution polymerization of the monomer, and the polymer is formed on the surface of the niobium sintered body having thereon a dielectric material. When the electrically conducting polymer is organic solvent-soluble and can be coated in the form of a solution, a method of coating the solution on the surface of the niobium sintered body is employed.

One preferred example of the production method by solution polymerization is a method where a valve-acting metal sintered body having formed thereon a dielectric layer is dipped in a solution containing an oxidizing agent (Solution 1) and then dipped in a solution containing a monomer and a dopant (Solution 2), thereby causing polymerization to form an electrically conducting polymer layer on the surface. The sintered body may be dipped in Solution 2 and then in Solution 1. Also, Solution 2 may be a monomer solution not containing a dopant. In the case of using a dopant, the dopant may be rendered to coexist in the solution containing an oxidizing agent.

This operation of the polymerization step is repeated once or more, preferably from 3 to 20 times, on the valve-acting metal sintered body having thereon a dielectric material, whereby a dense and layered electrically conducting polymer layer can be easily formed.

The oxidizing agent for use in the production method of a capacitor of the present invention is sufficient if the oxidizing agent does not adversely affect the capacitor performance and the reductant of the oxidizing agent works out to a dopant and enhances the electric conductivity of the electrically conducting polymer. An oxidizing agent which is industrially inexpensive and easily handleable in view of production is preferred.

Specific examples of such an oxidizing agent include Fe(III) compounds such as $FeCl_3$, $FeClO_4$ and Fe (organic acid anion) salt, anhydrous aluminum chloride/copper(I) chloride, alkali metal persulfates, ammonium persulfates, peroxides, manganeses such as potassium permanganate, quinones such as 2,3-dichloro-5,6-dicyano-1,4-benzoquinone (DDQ), tetrachloro-1,4-benzoquinone and tetracyano-1,4-benzoquinone, halogens such as iodine and bromine, peracid, sulfuric acid, fuming sulfuric acid, sulfur trioxide, sulfonic acids such as chlorosulfuric acid, fluorosulfuric acid and amidosulfuric acid, ozone, and combinations of a plurality of these oxidizing agents.

Examples of the base compound for the organic acid anion constituting the Fe (organic acid anion) salt include an organosulfonic acid, an organocarboxylic acid, an organophosphoric acid and an organoboric acid. Specific examples of the organosulfonic acid include benzenesulfonic acid, p-toluenesulfonic acid, methanesulfonic acid, ethanesulfonic acid, α-sulfonaphthalene, β-sulfonaphthalene, naphthalenedisulfonic acid and alkylnaphthalenesulfonic acid (examples of the alkyl group include butyl, triisopropyl and di-tert-butyl).

Specific examples of the organocarboxylic acid include acetic acid, propionic acid, benzoic acid and oxalic acid. Furthermore, in the present invention, a polyelectrolyte anion such as polyacrylic acid, polymethacrylic acid, polystyrenesulfonic acid, polyvinylsulfonic acid, polyvinylsulfuric acid, poly-α-methylsulfonic acid, polyethylenesulfonic acid and polyphosphoric acid may also be used. However, these are described only for the purpose of illustrating examples of the organosulfonic acid and the organocarboxylic acid and the present invention is not limited thereto. Examples of the counter cation of the above-described anion include, but are not limited to, $H^+$, alkali metal ion such as $Na^+$ and $K^+$, and ammonium ion substituted by a hydrogen atom, a tetramethyl group, a tetraethyl group, a tetrabutyl group or a tetraphenyl group. Among these oxidizing agents, preferred are oxidizing agents containing a trivalent Fe compound, copper(I) chloride, an alkali persulfate, an ammonium persulfate or a quinone.

The anion (anion except for the reductant anion of the oxidizing agent) having a dopant ability which is allowed to be present together, if desired, in the production process of the electrically conducting polymer may be an electrolyte anion having, as a counter anion, an oxidizing agent anion (a reductant of the oxidizing agent) produced from the above-described oxidizing agent, or other electrolyte anions. Specific examples thereof include halide anion of Group 15 elements, such as $PF_6^-$, $SbF_6^-$ and $AsF_6^-$, halide anion of Group 13 elements, such as $BF_4^-$, halogen anion such as $I^-(I_3^-)$, $Br^-$ and $Cl^-$, perhalogenate anion such as $ClO_4^-$, Lewis acid anion such as $AlCl_4^-$, $FeCl_4^-$ and $SnCl_5^-$, and protonic acid anion including inorganic acid anion such as $NO_3^-$ and $SO_4^{2-}$, sulfonate anion such as p-toluenesulfonic acid, naphthalenesulfonic acid and alkyl-substituted naphthalenesulfonic acid having from 1 to 5 carbon atoms, organosulfonate anion such as $CF_3SO_3^-$ and $CH_3SO_3^-$, and carboxylate anion such as $CH_3COO^-$ and $C_6H_5COO^-$.

Other examples include anions of polyelectrolyte such as polyacrylic acid, polymethacrylic acid, polystyrenesulfonic acid, polyvinylsulfonic acid, polyvinylsulfuric acid, poly-α-methylsulfonic acid, polyethylenesulfonic acid and polyphosphoric acid. However, the present invention is not limited thereto. The anion is preferably a polymer or low molecular organosulfonic acid compound anion or a polyphosphoric acid compound anion, and an aromatic sulfonic acid compound (e.g., sodium dodecylbenzene sulfonate, sodium naphthalenesulfonate) is preferably used as the anion-donating compound.

Among the organosulfonate anions, more effective dopants are a sulfoquinone compound having one or more sulfo-anion group ($-SO_3^-$) and a quinone structure within the molecule, and an anthracenesulfonate anion.

Examples of the basic skeleton for the sulfoquinone anion in the sulfoquinone compound include p-benzoquinone, o-benzoquinone, 1,2-naphthoquinone, 1,4-naphthoquinone, 2,6-naphthoquinone, 9,10-anthraquinone, 1,4-anthraquinone, 1,2-anthraquinone, 1,4-chrysenequinone, 5,6-chrysenequinone, 6,12-chrysenequinone, acenaphthoquinone, acenaphthenequinone, camphorquinone, 2,3-bornanedione, 9,10-phenanthrenequinone and 2,7-pyrenequinone.

In the case where the counter electrode is solid, an electrically conducting layer may be provided thereon so as to attain good electric contact with an exterior outgoing lead (for example, lead frame), if desired.

The electrically conducting layer can be formed, for example, by the solidification of an electrically conducting paste, plating, metal deposition or formation of heat-resistant electrically conducting resin film. Preferred examples of the electrically conducting paste include silver paste, copper paste, aluminum paste, carbon paste and nickel paste, and these may be used individually or in combination of two or more thereof. In the case of using two or more pastes, the pastes may be mixed or may be superposed one on another as separate layers. The electrically conducting paste applied is then solidified by allowing it to stand in air or under heating. Examples of the plating include nickel plating, copper plating, silver plating and aluminum plating. Examples of the metal vapor-deposited include aluminum, nickel, copper and silver.

More specifically, for example, carbon paste and silver paste are stacked in this order on the second electrode and these are molded with a material such as epoxy resin, whereby a capacitor is fabricated. This capacitor may have a valve-acting metal lead which is sintered and shaped integrally with the valve-acting metal sintered body or welded afterward.

The thus-fabricated capacitor of the present invention is jacketed by using, for example, resin mold, resin case, metallic jacket case, dipping of resin or laminate film, and then used as a capacitor product for various uses.

In the case where the counter electrode is liquid, the capacitor constituted by those two electrodes and a dielectric material is housed, for example, in a can electrically connected to the counter electrode, thereby completing the capacitor. In this case, the electrode side of the valve-acting metal sintered body is guided outside through a valve-acting metal lead described above and at the same time, insulated from the can by using an insulating rubber or the like.

The valve-acting metal sintered body for capacitors produced in this way according to the embodiment of the present invention is particularly effective in impregnating a cathode material into a large sintered body having a volume of 10 mm$^3$ or more and when a capacitor is produced from this sintered body, high capacitance, low ESR and low tan δ can be achieved and a capacitor having a small leakage current value and good long-term reliability can be obtained.

The capacitor of the present invention has a large electrostatic capacitance for the volume as compared with conventional tantalum capacitors and a more compact capacitor product can be obtained.

The capacitor having these properties of the present invention can be applied to uses as a bypass or coupling capacitor often used in an analog or digital circuit and also to uses of smoothing power supply circuit or noise filter in conventional tantalum capacitor.

In general, such a capacitor is used in an electronic circuit on many occasions and therefore, when the capacitor of the present invention is used, the restriction in arrangement of electronic parts or discharge of heat is relieved and a highly reliable electronic circuit can be packaged in a narrower space than in conventional techniques.

Furthermore, when the capacitor of the present invention is used, a highly reliable electronic device more compact than conventional ones, such as computer, computer peripheral device (e.g., PC card), mobile device (e.g., cellular telephone), home appliance, in-vehicle device, artificial satellite and communication device, can be obtained.

BEST MODE FOR CARRYNG OUT THE INVENTION

Figure 1:
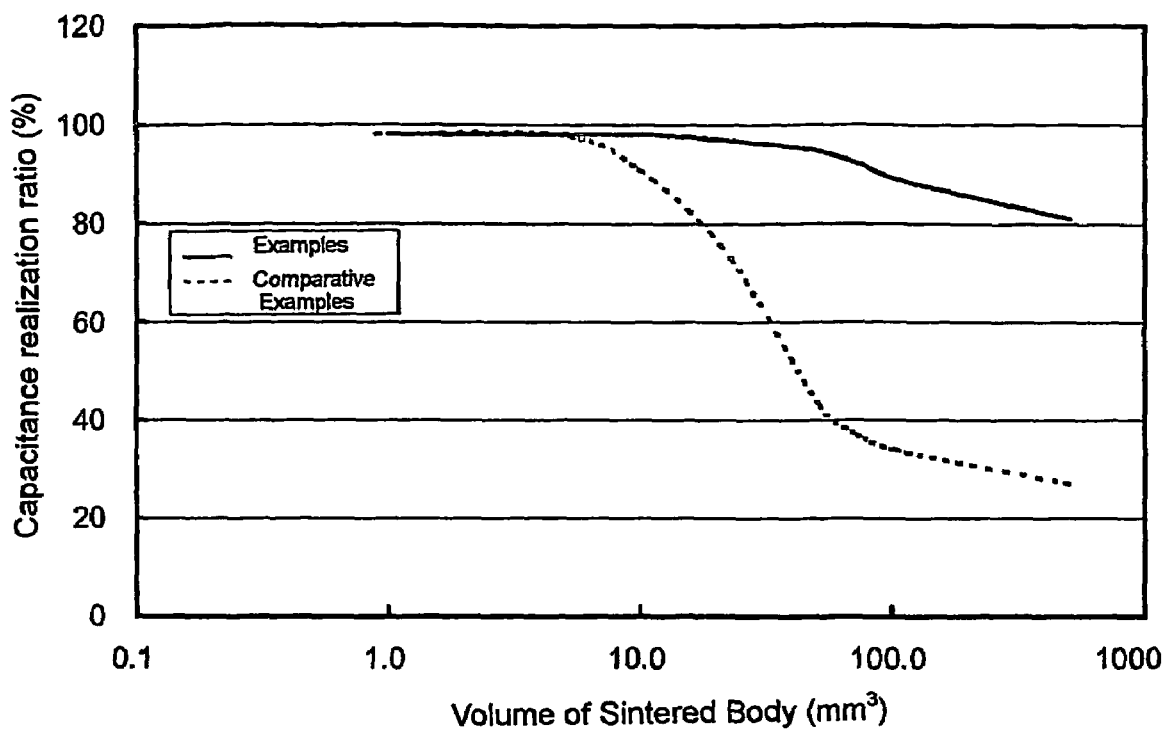
FIG. 1 is a graph showing the capacitance realization ratio of capacitors of Examples 27 to 34 and Comparative Examples 3 to 10.

The present invention is described in greater detail below by referring to Examples and Comparative Examples, however, the present invention is not limited thereto. In each Example, the tapping density, angle of repose, particle size, pore diameter and capacitance, leakage current value, capacitance realization ratio and moisture resistance of capacitor were measured by the following method.

(1) Porosity of Sintered Body

The bulk density of the sintered body was determined from the outside dimension and mass of the sintered body; the true density of the sintered body was determined by a picnometer, and the porosity of the sintered body was calculated according to the following formula:

Porosity (%)={1-(bulk density/true density)}×100

(2) Measurement of Particle Size

The particle size distribution was measured according to a laser diffraction scattering method by using a particle size distribution analyzer (HRA 9320-X100, manufactured by Microtrac, Inc.) and the particle size value ($D_{50}$; μm) where the cumulative weight was corresponding to 50 vol % was used as the average particle size.

(3) Measurement of Pore Diameter

The pore distribution was measured according to a mercury press-fitting method by using an apparatus (Poresier 9320, manufactured by Micromeritics Instrument Corporation).

In the present invention, the maximum value was determined from the rate of change in the press-fitted amount and the pore diameter at the maximum value was used as the peak top. When a plurality of maximum values was present, each was used as the peak top.

(4) Volume Ratio of Pores of 1 μm or More

The pore distribution was measured according to a mercury press-fitting method by using an apparatus (Poresier 9320, manufactured by Micromeritics Instrument Corporation).

In the present invention, the ratio of the volume (ml) of pores of 1 μm or more to the entire pore volume (ml) was used as the volume ratio (vol %) of pores of 1 μm or more.

(5) Capacitance of Anode Sintered Body

The capacitance when a sintered body electrochemically formed in an aqueous 0.1% phosphoric acid solution for 600 minutes under the conditions of 80° C. and 20 V was measured at room temperature in 30% sulfuric acid with a bias of 1.5 V at 120 Hz was used as the capacitance of the anode sintered body.

(6) Measurement of Capacitance and tan δ of Capacitor

The capacitance and tan δ value measured at room temperature with a bias of 1.5 V at 120 Hz by connecting an LCR measuring apparatus manufactured by Hewlett-Packard Company between terminals of the produced chip were used as the capacitance and tan δ of a capacitor worked into a chip.

(7) Measurement of Leakage Current of Capacitor

The current value measured after a dc voltage of 6.3 V was continuously applied between terminals of the produced chip at room temperature for 1 minute was used as the leakage current value of a capacitor worked into a chip.

(8) Measurement of ESR of Capacitor

The ESR value measured at room temperature at 100 kHz, 1.5 VDC and 0.5 Vrms by connecting an LCR measuring apparatus manufactured by Hewlett-Packard Company between terminals of the produced chip was used as ESR of a capacitor worked into a chip.

(9) Capacitance Realization ratio of Capacitor

The capacitance realization ratio of a capacitor was shown by the ratio (%) of the capacitance after a capacitor was formed, to the capacitance measured in 30% sulfuric acid with a bias of 1.5 V at 120 Hz, of a sintered body electrochemically formed in an aqueous 0.1% phosphoric acid solution for 600 minutes under the conditions of 80° C. and 20 V.

(10) Moisture Resistance of Capacitor

The moisture resistance of a capacitor was shown by the number of units where the capacitance after a produced capacitor was left standing at 60° C. and 95% RH for 2,000 hours was less than 110% of the initial value. As the number of units where the capacitance was less than 110% was larger, the moisture resistance was judged higher.

(11) ESR Stability of Capacitor

The ESR stability was shown by the number of units where the ESR value after a produced capacitor was left standing at 60° C. and 95% RH for 2, 000 hours was less than 100±10% of the initial value. As the number of units where the ESR value was less than 100±10% was larger, the ESR stability was judged higher.

In Examples and Comparative Examples, a capacitor was produced from a sintered body by any one of the following methods 1 to 4.

Capacitor Production Method 1:

100 Units of a valve-acting metal anode sintered body having on the surface thereof an oxide dielectric film formed by electrolytic oxidation at a voltage of 20 V for 6 hours in an aqueous 0.1% phosphoric acid solution were prepared. Then, an operation of dipping the sintered body in an aqueous 60% manganese nitrate solution and then heating it at 220° C. for 30 minutes was repeated to form a manganese dioxide layer as the counter electrode layer on the oxide dielectric film. On this counter electrode layer, a carbon layer and a silver paste layer were sequentially stacked and after placing the stacked body on a lead frame, the entirety was molded with an epoxy resin to produce a chip capacitor.

Capacitor Production Method 2:

100 Units of a valve-acting metal sintered body having on the surface thereof an oxide dielectric film formed by electrolytic oxidation at a voltage of 20 V for 6 hours in an aqueous 0.1% phosphoric acid solution were prepared. Then, an operation of dipping the sintered body in a 1:1 (volume ratio) mixed solution of an aqueous 35% lead acetate solution and an aqueous 35% ammonium persulfate solution and then allowing the reaction to proceed at 40° C. for 1 hour was repeated to form a mixed layer of lead dioxide and lead sulfate as the counter electrode layer on the oxide dielectric film. On this counter electrode layer, a carbon layer and a silver paste layer were sequentially stacked and after placing the stacked body on a lead frame, the entirety was molded with an epoxy resin to produce a chip capacitor.

Capacitor Production Method 3:

100 Units of a valve-acting metal sintered body having on the surface thereof an oxide dielectric film formed by electrolytic oxidation at a voltage of 20 V for 6 hours in an aqueous 0.1% phosphoric acid solution were prepared. Then, an operation of contacting the oxide dielectric film with an equivalent mixed solution of an aqueous 10% ammonium persulfate solution and an aqueous 0.5% anthraquinonesulfonic acid solution and then contacting it with a pyrrole vapor was repeated at least 5 times to form a counter electrode comprising polypyrrole. On this counter electrode, a carbon layer and a silver paste layer were sequentially stacked and after placing the stacked body on a lead frame, the entirety was molded with an epoxy resin to produce a chip capacitor.

Capacitor Production Method 4:

100 Units of a valve-acting metal sintered body having on the surface thereof an oxide dielectric film formed by electrolytic oxidation at a voltage of 20 V for 6 hours in an aqueous 0.1% phosphoric acid solution were prepared. Then, the valve-acting metal sintered body was dipped in an aqueous solution containing 25 mass % of ammonium persulfate (Solution 1), pulled up and dried at 80° C. for 30 minutes. Thereafter, the sintered body having formed thereon a dielectric material was dipped in an isopropanol solution containing 18 mass % of 3,4-ethylenedioxythiophene (Solution 2), pulled up and left standing in an atmosphere of 60° C. for 10 minutes, thereby performing the oxidation polymerization. The resulting sintered body was again dipped in Solution 1 and then treated in the same manner as above. After repeating the operation from the dipping in Solution 1 until the oxidation polymerization 8 times, the sintered body was washed with hot water at 50° C. for 10 minutes and dried at 100° C. for 30 minutes, thereby forming a counter electrode comprising electrically conducting poly(3,4-ethylenedioxythiophene). On this counter electrode, a carbon layer and a silver paste layer were sequentially stacked and after placing the stacked body on a lead frame, the entirety was molded with an epoxy resin to produce a chip capacitor.

EXAMPLE 1

At room temperature, 500 g of camphor was dissolved in 10 L of toluene. In the resulting solution, 8.4 kg of niobium hydride powder having an average particle size of 0.5 μm produced by the method of grinding niobium hydride, 800 g of barium oxide powder having an average particle size of 0.7 μm, and 800 g of barium oxide powder having an average particle size of 2 μm were dispersed. The obtained dispersion was mixed for 1 hour in Dynomill by using zirconia beads. The resulting slurry was charged in Nauter mixer and granulated while drying it under reduced pressure in the conditions of $1\times10^2$ Pa and 80° C. to obtain a granulated product comprising a mixture of niobium hydride, barium oxide and camphor and having an average particle size of 120 μm. This mixture granulated product was dehydrogenated at 480° C. under reduced pressure of $1\times10^2$ Pa or less, thereby converting the niobium hydride into niobium and at the same time, removing the camphor, to obtain 10 kg of a hard granulated product comprising a mixture of niobium and barium oxide and having an average particle size of 120 μm. The obtained hard granulated product comprising a mixture of niobium and barium oxide was dispersed in a solution prepared by dissolving 300 g of polyisobutyl methacrylate in 5 L of toluene and dried under reduced pressure in the conditions of $1\times10^2$ Pa and 80° C. to obtain a granulated product comprising a mixture of niobium, barium oxide and polyisobutyl methacrylate and having an average particle size of 120 μm.

The mixture granulated product obtained in this way was charged into a hopper of a tantalum device automatic shaping machine (TAP-2R, manufactured by Seiken Co., Ltd.) and automatically shaped together with a niobium wire of 0.3 mmφ to obtain a shaped article having a size of about 3.3 mm×1.8 mm×4.3 mm (about 25 mm³). The density of this shaped article was 2.8 g/ml in terms of niobium (niobium amount: 72 mg).

Next, this shaped article was heated at 250 to 400° C. for 3 hours under $10^{-2}$ to $10^2$ Pa to decompose and remove the polyisobutyl methacrylate, sintered by allowing it to stand at 1,150° C. for 30 minutes under reduced pressure of $4\times10^{-3}$ Pa, and then cooled until the product temperature became 30° C. or less. Subsequently, an operation of gradually adding a nitrogen gas containing 0.1 vol % of oxygen while keeping the product temperature not to exceed 30° C. and then removing the gas under reduced pressure was repeated until the product temperature stopped changing. Thereafter, the resulting barium oxide-mixed niobium sintered body was left standing for 8 hours or more and then taken out.

1,000 Units of the thus-obtained barium oxide-mixed niobium sintered body and 1,000 g of ion exchanged water were placed in a polytetrafluoroethylene-made vessel and cooled to 15° C. or less. Separately, a mixed aqueous solution containing 600 g of 60% nitric acid, 150 g of 30% hydrogen peroxide and 750 g of ion exchanged water, cooled to 15° C. or less, was prepared. While stirring and keeping the solution temperature not to exceed 20° C., 500 g of the aqueous solution prepared was added dropwise to the vessel containing the barium oxide-mixed niobium sintered body and ion exchanged water to dissolve the barium oxide. After the completion of dropwise addition, the stirring was further continued for 2 hours and then the contents were left standing for 30 minutes and then decanted. Furthermore, 2000 g of ion exchanged water was added and after stirring for 30 minutes, the contents were left standing for 30 minutes and then decanted. This operation was repeated 5 times and then, the niobium sintered body was put in a polytetrafluoroethylene-made column and washed for 4 hours while passing ion exchanged water to remove the barium oxide as a barium salt. The electric conductivity of the washing water at this time was 0.9 μS/cm.

The resulting niobium sintered body was dried under reduced pressure in the conditions of $1\times10^2$ Pa and 50° C. and then cooled until the product temperature became 30° C. or less. Subsequently, an operation of gradually adding a nitrogen gas containing 0.1 vol % of oxygen while keeping the product temperature not to exceed 30° C. and then removing the gas under reduced pressure was repeated until the product temperature stopped changing, and then the sintered body was left standing for 8 hours or more to obtain a niobium sintered body implanted with a niobium lead wire. This sintered body had a volume of about 22 mm³, a density of 3.2 g/ml, a specific surface area of 0.0077 m²/mm³ and a porosity of 63%. Also, the sintered body had pore diameter peak tops at 0.7 μm and 2 μm and the volume of pores of 1 μm or more was 17 vol % of the entire vacancy volume.

Then, 100 units of this sintered body were prepared and electrochemically formed at a voltage of 20 V for 600 minutes by using an aqueous 0.1% phosphoric acid solution to form an oxide dielectric film on the surface.

From this electrochemically formed niobium anode sintered body, a chip capacitor was produced by using Capacitor Production Method 4. The produced capacitor had a capacitance realization ratio of 98% and a capacitance of 766 μF/unit.

EXAMPLES 2 to 4

Niobium sintered bodies each implanted with a niobium lead wire were obtained in the same manner as in Example 1 except that a nitridation treatment was performed in a nitrogen atmosphere at 300° C. for 2 hours before shaping (Example 2), after shaping but before sintering (Example 3), or after sintering but before removal of barium oxide (Example 4). 100 Units of each sintered body were prepared and electrochemically formed at a voltage of 20 V for 600 minutes by using an aqueous 0.1% phosphoric acid solution to form an oxide dielectric film on the surface. From these electrochemically formed niobium anode sintered bodies, chip capacitors were produced by using Production Method 1, 2 or 3 of Capacitor. The physical properties of each sintered body and the capacitance realization ratio and electric properties of each capacitor are shown in Tables 1 to 3.

EXAMPLE 5

A niobium secondary aggregated powder having an average particle size of 7 μm resulting from aggregation of primary particles having an average particle size of about 0.5 μm was prepared by the method of reducing niobium oxide. At room temperature, 300 g of polymethyl methacrylate methyl ester was dissolved in 10 L of toluene. In the resulting solution, 8.5 kg of niobium aggregated powder and 1.5 kg of calcium oxide powder having an average particle size of 0.9 μm were dispersed. The obtained dispersion was mixed for 1 hour in Dynomill by using zirconia beads. The resulting slurry was charged in Nauter mixer and granulated while drying it under reduced pressure in the conditions of $1\times10^2$ Pa and 80° C. to obtain a granulated product comprising a mixture of niobium, calcium oxide and polymethyl methacrylate methyl ester and having an average particle size of 180 μm. This mixture granulated product was charged into a hopper of a tantalum device automatic shaping machine (TAP-2R, manufactured by Seiken Co., Ltd.) and automatically shaped without using a lead wire to obtain a shaped article having a size of about 3.3 mm×1.8 mm×4.3 mm (about 25 mm³). The density of this shaped article was 3.0 g/ml in terms of niobium (niobium amount: 76 mg).

Next, this shaped article was heated at 250 to 400° C. for 3 hours under $10^{-2}$ to $10^2$ Pa to decompose and remove the polymethyl methacrylate methyl ester, sintered by allowing it to stand at 1,200° C. for 30 minutes under reduced pressure of $4\times10^{-3}$ Pa, and then cooled until the product temperature became 30° C. or less. Subsequently, an operation of gradually adding a nitrogen gas containing 0.1 vol % of oxygen while keeping the product temperature not to exceed 30° C. and then removing the gas under reduced pressure was repeated until the product temperature stopped changing. Thereafter, the resulting calcium oxide-mixed niobium sintered body was left standing for 8 hours or more and then taken out.

1,000 Units of the thus-obtained calcium oxide-mixed niobium sintered body and 1,000 g of ion exchanged water were placed in a polytetrafluoroethylene-made vessel and cooled to 15° C. or less. Separately, a mixed aqueous solution containing 600 g of 60% nitric acid, 150 g of 30% hydrogen peroxide and 750 g of ion exchanged water and being cooled to 20° C. or less was prepared. While stirring and keeping the solution temperature not to exceed 20° C., 500 g of the aqueous solution prepared was added dropwise to the vessel containing the calcium oxide-mixed niobium sintered body and ion exchanged water to dissolve the calcium oxide. After the completion of dropwise addition, the stirring was further continued for 2 hours and then the contents were left standing for 30 minutes and then decanted. Furthermore, 2,000 g of ion exchanged water was added and after stirring for 30 minutes, the contents were left standing for 30 minutes and then decanted. This operation was repeated 5 times and then, the niobium sintered body was put in a polytetrafluoroethylene-made column and washed for 4 hours while passing ion exchanged water to remove the calcium oxide as a calcium salt. The electric conductivity of the washing water at this time was 0.9 µS/cm.

The resulting niobium sintered body was dried under reduced pressure in the conditions of $1\times10^2$ Pa and 50° C. and then cooled until the product temperature became 30° C. or less. Subsequently, an operation of gradually adding a nitrogen gas containing 0.1 vol % of oxygen while keeping the product temperature not to exceed 30° C. and then removing the gas under reduced pressure was repeated until the product temperature stopped changing, and then the sintered body was left standing for 8 hours or more to obtain a niobium sintered body. To this sintered body, a niobium lead wire of 0.3 mmφ was spot-welded to produce a niobium sintered body for use as the anode.

This sintered body had a volume of about 23 mm$^3$, a density of 3.3 g/ml, a specific surface area of 0.0073 m$^2$/mm$^3$ and a porosity of 61%. Also, the sintered body had a pore diameter peak top at 0.8 µm and the volume of pores of 1 µm or more was 19 vol % of the entire vacancy volume.

Then, 100 units of this sintered body were prepared and electrochemically formed at a voltage of 20 V for 600 minutes by using an aqueous 0.1% phosphoric acid solution to form an oxide dielectric film on the surface. From this electrochemically formed niobium anode sintered body, a chip capacitor was produced by using Capacitor Production Method 4. The capacitance realization ratio and electric properties of the produced capacitor are shown in Tables 1 to 3.

EXAMPLES 6 to 24

Granulated products each comprising a mixture of niobium, a pore-forming agent and a binder were obtained in the same manner as in Example 1 or 5 by using niobium powders differing in the average particle size, pore-forming agents differing in the average particle size, and paraffin, vegetable oil, camphor, polyacrylic polymer, polymethacrylic polymer or polyvinyl-based polymer for the binder. Each granulated product was shaped and sintered at 1,000 to 1,500° C. and then, the pore-forming agent was removed by using a solvent suitable for the pore-forming agent. Each sintered body was treated in the same manner as in Example 1 or 5 to obtain a niobium sintered body for use as the anode. 100 Units of each sintered body were prepared and electrochemically formed at a voltage of 20 V for 600 minutes by using an aqueous 0.1% phosphoric acid solution to form an oxide dielectric film on the surface. From these electrochemically formed niobium sintered bodies, chip capacitors were produced by using Production Method 1, 2, 3 or 4 of Capacitor. The physical properties of each sintered body and the capacitance realization ratio and electric properties of each capacitor are shown in Tables 1 to 3.

EXAMPLE 25

A niobium monoxide secondary aggregated powder having an average particle size of 6 µm resulting from aggregation of primary particles having an average particle size of about 0.3 µm was prepared by the method of reducing niobium pentoxide. At room temperature, 300 g of polymethyl methacrylate methyl ester was dissolved in 10 L of toluene. In the resulting solution, 8.5 kg of niobium aggregated powder and 1.5 kg of calcium oxide powder having an average particle size of 0.9 µm were dispersed. The obtained dispersion was mixed for 1 hour in Dynomill by using zirconia beads. The resulting slurry was charged in Nauter mixer and granulated while drying it under reduced pressure in the conditions of $1\times10^2$ Pa and 80° C. to obtain a granulated product comprising a mixture of niobium monoxide, calcium oxide and polymethyl methacrylate methyl ester and having an average particle size of 170 µm. This mixture granulated product was charged into a hopper of a tantalum device automatic shaping machine (TAP-2R, manufactured by Seiken Co., Ltd.) and automatically shaped without using a lead wire to obtain a shaped article having a size of about 3.3 mm×1.8 mm×4.3 mm (about 25 mm$^3$). The density of this shaped article was 3.0 g/ml in terms of niobium monoxide (niobium monoxide amount: 76 mg).

Next, this shaped article was heated at 250 to 400° C. for 3 hours under $10^{-2}$ to $10^2$ Pa to decompose and remove the polymethyl methacrylate methyl ester, sintered by allowing it to stand at 1,200° C. for 30 minutes under reduced pressure of $4\times10^{-3}$ Pa, and then cooled until the product temperature became 30° C. or less. Subsequently, an operation of gradually adding a nitrogen gas containing 0.1 vol % of oxygen while keeping the product temperature not to exceed 30° C. and then removing the gas under reduced pressure was repeated until the product temperature stopped changing. Thereafter, the resulting calcium oxide-mixed niobium monoxide sintered body was left standing for 8 hours or more and then taken out.

1,000 Units of the thus-obtained calcium oxide-mixed niobium monoxide sintered body and 1,000 g of ion exchanged water were placed in a polytetrafluoroethylene-made vessel and cooled to 15° C. or less. Separately, a mixed aqueous solution containing 600 g of 60% nitric acid, 150 g of 30% hydrogen peroxide and 750 g of ion exchanged water and being cooled to 20° C. or less was prepared. While stirring and keeping the solution temperature not to exceed 20° C., 500 g of the aqueous solution prepared was added dropwise to the vessel containing the calcium oxide-mixed niobium monoxide sintered body and ion exchanged water to dissolve the calcium oxide. After the completion of dropwise addition, the stirring was further continued for 2 hours and then the contents were left standing for 30 minutes and then decanted. Furthermore, 2000 g of ion exchanged water was added and after stirring for 30 minutes, the contents were left standing for 30 minutes and then decanted. This operation was repeated 5 times and then, the niobium monoxide sintered body was put in a polytetrafluoroethylene-made column and washed for 4 hours while passing ion exchanged water to remove the calcium oxide as a calcium salt. The electric conductivity of the washing water at this time was 0.8 µS/cm.

The resulting niobium monoxide sintered body was dried under reduced pressure in the conditions of $1\times10^2$ Pa and 50° C. and then cooled until the product temperature became 30°

C. or less. Subsequently, an operation of gradually adding a nitrogen gas containing 0.1 vol % of oxygen while keeping the product temperature not to exceed 30° C. and then removing the gas under reduced pressure was repeated until the product temperature stopped changing, and then the sintered body was left standing for 8 hours or more to obtain a niobium monoxide sintered body. To this sintered body, a niobium lead wire of 0.3 mmϕ was spot-welded to produce a niobium monoxide sintered body for use as the anode.

This sintered body had a volume of about 23 mm$^3$, a density of 3.3 g/ml, a specific surface area of 0.0115 m$^2$/mm$^3$ and a porosity of 61%. Also, the sintered body had a pore diameter peak top at 0.7 μm and the volume of pores of 1 μm or more was 17 vol % of the entire vacancy volume. Then, 100 units of this sintered body were prepared and electrochemically formed at a voltage of 20 V for 600 minutes by using an aqueous 0.1% phosphoric acid solution to form an oxide dielectric film on the surface. From this electrochemically formed niobium monoxide anode sintered body, a chip capacitor was produced by using Capacitor Production Method 4. The capacitance realization ratio and electric properties of the produced capacitor are shown in Tables 2 to 3.

Comparative Example 1

A niobium sintered body was obtained by shaping a niobium powder and sintering the shaped article in the same manner as in Example 1 without using a pore-forming agent. 100 Units of this sintered body were prepared and electrochemically formed at a voltage of 20 V for 600 minutes by using an aqueous 0.1% phosphoric acid solution to form an oxide dielectric film on the surface. From this electrochemically formed niobium sintered body, a chip capacitor was produced by using Capacitor Production Method 4. The physical properties of the sintered body and the capacitance realization ratio and electric properties of the capacitor are shown in Tables 1 to 3.

Comparative Example 2

A niobium sintered body was obtained by shaping a niobium powder and sintering the shaped article in the same manner as in Example 5 without using a pore-forming agent. 100 Units of this sintered body were prepared and electrochemically formed at a voltage of 20 V for 600 minutes by using an aqueous 0.1% phosphoric acid solution to form an oxide dielectric film on the surface. From this electrochemically formed niobium sintered body, a chip capacitor was produced by using Capacitor Production Method 4. The physical properties of the sintered body and the capacitance realization ratio and electric properties of the capacitor are shown in Tables 1 to 3.

TABLE 1

| Example No./Comparative Example No. | Average Particle Size of Niobium, μm | Other Components Contained in Niobium | Pore-Forming Agent Kind | Average Particle Size, μm | Amount* Added, mass % |
|---|---|---|---|---|---|
| Ex. 1 | 0.5 | oxygen | barium oxide | 0.7 | 8 |
|  |  |  | " | 2 | 8 |
| Ex. 2 | 0.5 | nitrogen | barium oxide | 0.9 | 12 |
|  |  |  | " | 3 | 6 |
| Ex. 3 | 0.5 | nitrogen | barium oxide | 0.7 | 8 |
|  |  |  | " | 3 | 6 |
| Ex. 4 | 0.5 | nitrogen | Barium oxide | 1.0 | 15 |
| Ex. 5 | 7 | — | Calcium oxide | 0.9 | 15 |
| Ex. 6 | 0.5 | rhenium | magnesium carbonate | 0.5 | 7 |
|  |  |  | " | 3 | 9 |
| Ex. 7 | 0.5 | nitrogen | magnesium oxide | 0.9 | 6 |
|  |  |  | " | 2 | 6 |
|  |  |  | " | 8 | 10 |
| Ex. 8 | 0.3 | nitrogen | magnesium oxide | 0.5 | 8 |
|  |  |  | barium oxide | 2 | 8 |
| Ex. 9 | 0.5 | aluminum | magnesium carbonate | 0.9 | 12 |
| Ex. 10 | 0.5 | tungsten | magnesium hydroxide | 0.8 | 12 |
| Ex. 11 | 0.5 | tantalum | magnesium oxide | 0.7 | 8 |
|  |  |  | " | 2 | 8 |
| Ex. 12 | 0.5 | hafnium | calcium hydroxide | 0.7 | 8 |
| Ex. 13 | 0.5 | zirconium | barium oxide | 0.7 | 8 |
|  |  |  | calcium oxide | 2 | 10 |
| Ex. 14 | 0.5 | neodymium | neodymium oxide | 0.9 | 12 |
| Ex. 15 | 0.6 | zinc | barium hydroxide | 0.9 | 7 |
| Ex. 16 | 0.5 | boron | magnesium oxide | 0.6 | 8 |
|  |  |  | " | 4 | 8 |
| Ex. 17 | 0.5 | yttrium | yttrium oxide | 0.6 | 8 |
|  |  | erbium | lanthanum oxide | 2 | 8 |
| Ex. 18 | 0.5 | ytterbium | cerium oxide | 0.8 | 8 |
|  |  | lutetium | samarium oxide | 3 | 5 |
| Ex. 19 | 0.3 | tantalum | magnesium oxide | 0.7 | 8 |
|  |  | nitrogen | manganese oxide | 2 | 8 |
| Ex. 20 | 0.5 | manganese | calcium oxide | 0.9 | 6 |
| Ex. 21 | 0.5 | molybdenum | cerium oxide | 0.8 | 8 |
|  |  | vanadium | magnesium oxide | 2 | 8 |
| Ex. 22 | 0.3 | antimony | barium oxide | 0.7 | 8 |

TABLE 1-continued

| Example No./ Comparative Example No. | Average Particle Size of Niobium, μm | Other Components Contained in Niobium | Pore-Forming Agent Kind | Average Particle Size, μm | Amount* Added, mass % |
|---|---|---|---|---|---|
| Ex. 23 | 0.3 | silicon nitrogen | barium oxide " | 0.7 2 | 8 8 |
| Ex. 24 | 0.3 | silicon nitride | magnesium oxide " | 0.7 2 | 8 8 |
| Ex. 25 | 6** | — | calcium oxide | 0.9 | 15 |
| Comp. Ex. 1 | 0.5 | — | — | — | — |
| Comp. Ex. 2 | 7 | — | — | — | — |

*The amount of pore-forming agent added is a ratio to the total amount of niobium component and pore-forming agent.
**The average particle size of niobium monoxide

TABLE 2

Physical Properties of Sintered Body

| | Volume of Sintered Body, mm$^3$ | Porosity, vol % | Pore Peak Top, μm | Volume of Vacancies of 1 μm or more, vol % | Specific Surface Area, m$^2$/mm$^3$ |
|---|---|---|---|---|---|
| Example 1 | 22 | 63 | 0.7 2.0 | 17 | 0.0077 |
| Example 2 | 23 | 64 | 0.8 2.8 | 21 | 0.0076 |
| Example 3 | 22 | 61 | 0.7 2.9 | 19 | 0.0078 |
| Example 4 | 24 | 59 | 1.0 | 15 | 0.0070 |
| Example 5 | 23 | 61 | 0.8 | 19 | 0.0073 |
| Example 6 | 22 | 67 | 0.5 2.9 | 16 | 0.0088 |
| Example 7 | 24 | 62 | 0.8 1.9 6.1 | 24 | 0.0078 |
| Example 8 | 22 | 62 | 0.5 2.0 | 16 | 0.0127 |
| Example 9 | 23 | 64 | 0.9 | 15 | 0.0085 |
| Example 10 | 22 | 63 | 0.8 | 15 | 0.0088 |
| Example 11 | 23 | 63 | 0.7 1.9 | 16 | 0.0074 |
| Example 12 | 22 | 60 | 0.7 | 15 | 0.0090 |
| Example 13 | 23 | 64 | 0.7 2.1 | 18 | 0.0095 |
| Example 14 | 22 | 61 | 0.8 | 16 | 0.0097 |
| Example 15 | 23 | 62 | 0.9 | 18 | 0.0074 |
| Example 16 | 22 | 62 | 0.6 3.5 | 20 | 0.0080 |
| Example 17 | 23 | 61 | 0.6 1.9 | 17 | 0.0076 |
| Example 18 | 22 | 61 | 0.8 2.8 | 17 | 0.0078 |
| Example 19 | 23 | 61 | 0.7 2.1 | 16 | 0.0118 |
| Example 20 | 22 | 60 | 0.8 | 15 | 0.0105 |
| Example 21 | 23 | 63 | 0.8 1.9 | 18 | 0.0109 |
| Example 22 | 23 | 63 | 0.7 | 17 | 0.0105 |
| Example 23 | 22 | 62 | 0.7 2.0 | 17 | 0.0109 |
| Example 24 | 22 | 64 | 0.7 1.9 | 16 | 0.0127 |
| Example 25 | 23 | 61 | 0.7 | 17 | 0.0115 |
| Comparative Example 1 | 17 | 52 | 0.5 | 4 | 0.0059 |
| Comparative Example 2 | 18 | 51 | 0.5 | 5 | 0.0058 |

TABLE 3

Properties of Capacitor

| | Production Method of Capacitor | Capacitance Realization ratio, % | Capacitance, μF/unit | ESR, mΩ | tan δ, % |
|---|---|---|---|---|---|
| Example 1 | 4 | 98 | 766 | 18 | 3 |
| Example 2 | 1 | 97 | 789 | 27 | 3 |
| Example 3 | 2 | 98 | 771 | 26 | 3 |
| Example 4 | 3 | 95 | 759 | 19 | 3 |
| Example 5 | 4 | 95 | 751 | 19 | 3 |
| Example 6 | 2 | 98 | 874 | 27 | 3 |
| Example 7 | 4 | 98 | 844 | 17 | 3 |
| Example 8 | 4 | 98 | 1253 | 17 | 4 |
| Example 9 | 3 | 95 | 886 | 18 | 3 |
| Example 10 | 4 | 95 | 956 | 17 | 4 |
| Example 11 | 3 | 97 | 768 | 19 | 3 |
| Example 12 | 4 | 95 | 894 | 17 | 3 |
| Example 13 | 3 | 97 | 980 | 18 | 4 |
| Example 14 | 4 | 96 | 963 | 18 | 4 |
| Example 15 | 3 | 95 | 764 | 18 | 3 |
| Example 16 | 4 | 98 | 795 | 17 | 3 |
| Example 17 | 3 | 98 | 787 | 18 | 3 |
| Example 18 | 4 | 98 | 769 | 18 | 3 |
| Example 19 | 3 | 98 | 1226 | 18 | 4 |
| Example 20 | 4 | 95 | 812 | 19 | 3 |
| Example 21 | 3 | 98 | 832 | 17 | 3 |
| Example 22 | 3 | 96 | 1041 | 15 | 4 |
| Example 23 | 4 | 97 | 1083 | 14 | 3 |
| Example 24 | 3 | 98 | 1261 | 13 | 3 |
| Example 25 | 4 | 96 | 1141 | 13 | 3 |
| Comparative Example 1 | 4 | 70 | 330 | 128 | 11 |
| Comparative Example 2 | 4 | 71 | 423 | 101 | 10 |

EXAMPLE 26

At room temperature, 300 g of polymethylmethacrylate methyl ester was dissolved in 10 L of toluene. In the resulting solution, 8.5 kg of niobium hydride powder having an average particle size of 0.5 μm produced by the method of grinding niobium hydride, and 1.5 kg of calcium powder having an average particle size of 0.9 μm were dispersed. The obtained dispersion was mixed for 1 hour in Dynomill by using zirconia beads. The resulting slurry was charged in a rotary evaporator under a pressure of 1×10$^2$ Pa at 40° C. to remove the solvent, thereby obtaining a mixed dispersion of niobium, polymethylmethacrylate methyl ester and calcium oxide. With this dispersion, a pattern of 10 mm×5 mm was printed on a clean niobium foil by using a metal mask having a thickness of 0.2 mm and a metal blade. The printed article was dried under atmospheric pressure at 80° C. to fix the dispersion on the foil.

Next, this printed article was heated at 250 to 400° C. for 3 hours under $10^{-2}$ to $10^2$ Pa to decompose and remove the polymethyl methacrylate methyl ester while dehydrated, sintered by allowing it to stand at 1,150° C. for 30 minutes under reduced pressure of $4\times10^{-3}$ Pa, and then cooled until the product temperature became 30° C. or less. Subsequently, an operation of gradually adding a nitrogen gas containing 0.1 vol % of oxygen while keeping the product temperature not to exceed 30° C. and then removing the gas under reduced pressure was repeated until the product temperature stopped changing. Thereafter, the resulting calcium oxide-mixed niobium sintered body was left standing for 8 hours or more and then taken out.

100 Sheets of the thus-obtained calcium oxide-mixed niobium sintered body and 1,000 g of ion exchanged water were placed in a polytetrafluoroethylene-made vessel and cooled to 15° C. or less. Separately, a mixed aqueous solution containing 600 g of 60% nitric acid, 150 g of 30% hydrogen peroxide and 750 g of ion exchanged water, cooled to 15° C. or less was prepared. While stirring and keeping the solution temperature not to exceed 20° C., 500 g of the aqueous solution prepared was added dropwise to the vessel containing the calcium oxide-mixed niobium sintered body and ion exchanged water to dissolve the calcium oxide. After the completion of dropwise addition, the stirring was further continued for 2 hours and then the contents were left standing for 30 minutes and then decanted. Furthermore, 2000 g of ion exchanged water was added and after stirring for 30 minutes, the contents were left standing for 30 minutes and then decanted. This operation was repeated 5 times and then, the niobium sintered body was put in a polytetrafluoroethylene-made column and washed for 4 hours while passing ion exchanged water to remove the calcium oxide as a calcium salt. The electric conductivity of the washing water was 0.9 μS/cm.

The resulting niobium sintered body was dried under reduced pressure in the conditions of $1\times10^2$ Pa and 50° C. and then cooled until the product temperature became 30° C. or less. Subsequently, an operation of gradually adding a nitrogen gas containing 0.1 vol % of oxygen while keeping the product temperature not to exceed 30° C. and then removing the gas under reduced pressure was repeated until the product temperature stopped changing, and then the sintered body was left standing for 8 hours or more, and then the sintered body was cut out along the printed pattern and a niobium lead wire welded thereto to obtain a niobium sintered body with a niobium lead wire. This sintered body had an area of about 50 mm$^2$ and a porosity of 74%. Also, the sintered body had pore diameter peak tops at 0.9 μm and the volume of pores of 1 μm or more was 16 vol % of the entire vacancy volume. The printed niobium powder was 14.2 mg.

Next, the sintered body was electrolytically formed at a voltage of 20 V for 600 minutes by using aqueous solution containing 0.1% phosphoric acid to form a dielectric oxide film on the surface.

From this electrochemically formed niobium anode sintered body, a chip capacitor was produced by using Capacitor Production Method 4. The produced capacitor had a capacitance realization ratio of 98% and a capacitance of 149 μF/unit, which value was 755 μF/unit in terms of the niobium weight (72 mg) in the case of compression molding on the same level with the values in Examples 1 to 5.

EXAMPLES 27 to 34

Granulated products each comprising a mixture of niobium, barium oxide and polyisobutyl methacrylate were obtained in the same manner as in Example 1. Each mixture granulated product was charged into a hopper of a tantalum device automatic shaping machine (TAP-2R, manufactured by Seiken Co., Ltd.) to give a sintered body having a volume of about 1 to about 500 mm$^3$ and automatically shaped together with a niobium wire to obtain a shaped article having about the size shown in Table 4 and the shaped article was sintered at 1,150° C. 100 Units of each sintered body were prepared and electrochemically formed at a voltage of 20 V for 600 minutes by using an aqueous 0.1% phosphoric acid solution to form an oxide dielectric film on the surface. From these sintered bodies, chip capacitors were produced by using Capacitor Production Method 4. The capacitance realization ratio of each capacitor is shown in Table 4 and FIG. 1.

Comparative Examples 3 to 10

Shaped articles each having about the size shown in Table 4 were obtained in the same manner as in Comparative Example 1 without using a pore-forming agent by charging the granulated product into a hopper of a tantalum device automatic shaping machine (TAP-2R, manufactured by Seiken Co., Ltd.) to give a sintered body having a volume of about 1 to about 500 mm$^3$ and automatically shaping it together with a niobium wire, and each shaped article was sintered at 1,150° C. 100 Units of each sintered body were prepared and electrochemically formed at a voltage of 20 V for 600 minutes by using an aqueous 0.1% phosphoric acid solution to form an oxide dielectric film on the surface. From these sintered bodies, chip capacitors were produced by using Capacitor Production Method 4. The capacitance realization ratio of each capacitor is shown in Table 4 and FIG. 1.

As apparent from Table 4 and FIG. 1, capacitors produced in Comparative Examples 3 to 10 exhibit an excellent capacitance realization ratio in cases where the volume of the sintered body is about 5 mm$^3$ or less, but in cases where the volume of the sintered body exceeds 10 mm$^3$, the capacitance realization ratio abruptly decreases. On the other hand, capacitors produced in Examples 27 to 34 maintained a high capacitance realization ratio even when the volume of the sintered body is 10 mm$^3$ or more. This reveals that the capacitors produced in Examples exhibited an excellent capacitance realization ratio particularly when a large sintered body having a volume of 10 mm$^3$ or more was used.

TABLE 4

| Example No. | Size of Shaped Article, mm | Volume of Sintered Body, mm$^3$ | Capacitance Realization ratio, % |
|---|---|---|---|
| Example 27 | 1.1 × 1.0 × 1.1 | 1 | 98 |
| Example 28 | 1.9 × 1.1 × 2.6 | 4.6 | 98 |
| Example 29 | 2.6 × 1.4 × 3.4 | 11 | 98 |
| Example 30 | 3.3 × 1.8 × 4.3 | 22 | 97 |
| Example 31 | 4.3 × 2.3 × 5.6 | 48 | 95 |
| Example 32 | 5.0 × 2.7 × 6.5 | 76 | 92 |
| Example 33 | 5.5 × 3.0 × 7.2 | 105 | 89 |
| Example 34 | 9.2 × 5.0 × 12.1 | 503 | 81 |
| Comparative Example 3 | 1.1 × 1.0 × 1.1 | 0.9 | 98 |

TABLE 4-continued

| Example No. | Size of Shaped Article, mm | Volume of Sintered Body, mm$^3$ | Capacitance Realization ratio, % |
|---|---|---|---|
| Comparative Example 4 | 1.9 × 1.1 × 2.6 | 4.8 | 98 |
| Comparative Example 5 | 2.6 × 1.4 × 3.4 | 10 | 91 |
| Comparative Example 6 | 3.3 × 1.8 × 4.3 | 23 | 73 |
| Comparative Example 7 | 4.3 × 2.3 × 5.6 | 52 | 43 |
| Comparative Example 8 | 5.0 × 2.7 × 6.5 | 74 | 37 |
| Comparative Example 9 | 5.5 × 3.0 × 7.2 | 103 | 34 |
| Comparative Example 10 | 9.2 × 5.0 × 12.1 | 509 | 27 |

EXAMPLE 35

Sintered bodies were produced in the same manner as in Examples 1, 2, 5, 6, 8, 10, 14, 19, 31, 32, 33 and 34 and 100 units of each sintered body were prepared. The sintered bodies were electrochemically formed at 80° C. and 20 V for 600 minutes in an aqueous 0.1% phosphoric acid solution to form an oxide dielectric film on the sintered body surface. These electrochemically formed sintered bodies were divided into groups each consisting of 50 units and a cathode material was impregnated into each electrochemically formed sintered body by Capacitor Production Method 2 or 4 while varying the kind of the cathode material between two 50-unit groups. Thereafter, a carbon paste and a silver paste were sequentially stacked and the entirety was molded with an epoxy resin to produce a chip capacitor. The capacitance realization ratio, moisture resistance and ESR stability of each capacitor produced are shown in Table 5.

Comparative Example 11

Sintered bodies were produced in the same manner as in Comparative Examples 1, 2, 7, 8, 9 and 10 and 100 units of each sintered body were prepared. The sintered bodies were electrochemically formed at 80° C. and 20 V for 600 minutes in an aqueous 0.1% phosphoric acid solution to form an oxide dielectric film on the sintered body surface. These electrochemically formed sintered bodies were divided into groups each consisting of 50 units and each electrochemically formed sintered body was impregnated with cathode material by Capacitor Production Method 2 or 4 while varying the kind of the cathode material between two 50-unit groups. Thereafter, a carbon paste and a silver paste were sequentially stacked and the entirety was molded with an epoxy resin to produce a chip capacitor. The capacitance realization ratio, moisture resistance and ESR stability of each capacitor produced are shown in Table 5.

From Table 5, it is found that the capacitor produced in Example 35 is excellent in the moisture resistance and ESR stability as compared with the capacitor produced in Comparative Example 11.

TABLE 5

| Example | Example Used for Production of Sintered Body | Capacitor Production Method | Number of Units with Moisture Resistance of Less Than 110% | Number of Units with ESR Stability of Less Than 100 ± 10% |
|---|---|---|---|---|
| Example 35 | Example 1 | 2 | 50/50 | 50/50 |
| | | 4 | 50/50 | 50/50 |
| | Example 2 | 2 | 50/50 | 50/50 |
| | | 4 | 50/50 | 50/50 |
| | Example 5 | 2 | 50/50 | 50/50 |
| | | 4 | 50/50 | 50/50 |
| | Example 6 | 2 | 50/50 | 50/50 |
| | | 4 | 50/50 | 50/50 |
| | Example 8 | 2 | 50/50 | 50/50 |
| | | 4 | 50/50 | 50/50 |
| | Example 10 | 2 | 50/50 | 50/50 |
| | | 4 | 50/50 | 50/50 |
| | Example 14 | 2 | 50/50 | 50/50 |
| | | 4 | 50/50 | 50/50 |
| | Example 19 | 2 | 50/50 | 50/50 |
| | | 4 | 50/50 | 50/50 |
| | Example 31 | 2 | 50/50 | 50/50 |
| | | 4 | 50/50 | 50/50 |
| | Example 32 | 2 | 48/50 | 49/50 |
| | | 4 | 48/50 | 47/50 |
| | Example 33 | 2 | 48/50 | 48/50 |
| | | 4 | 48/50 | 49/50 |
| | Example 34 | 2 | 47/50 | 48/50 |
| | | 4 | 48/50 | 47/50 |
| Comparative Example 11 | Comparative Example 1 | 2 | 37/50 | 37/50 |
| | | 4 | 32/50 | 29/50 |
| | Comparative Example 2 | 2 | 39/50 | 35/50 |
| | | 4 | 34/50 | 30/50 |
| | Comparative Example 7 | 2 | 15/50 | 3/50 |
| | | 4 | 12/50 | 2/50 |
| | Comparative Example 8 | 2 | 5/50 | 1/50 |
| | | 4 | 2/50 | 0/50 |
| | Comparative Example 9 | 2 | 5/50 | 1/50 |
| | | 4 | 1/50 | 1/50 |
| | Comparative Example 10 | 2 | 2/50 | 0/50 |
| | | 4 | 0/50 | 0/50 |

EXAMPLE 36

Using 9 kg of tantalum hydride powder having an average particle size of 0.5 μm which was obtained by grinding tantalum hydride, 500 g of barium oxide powder having an average particle size of 0.7 μm and 500 g of barium oxide powder having an average particle size of 2 μm, a granulated product each comprising a mixture of tantalum, barium oxide and polyisobutyl methacrylate and having an average particle size of 120 μm was obtained in the same manner as in Example 1. The mixture granulated product was automatically shaped to have a size of about 3.3 mm×1.8 mm×4.2 mm (about 25 mm$^3$). The density of the shaped article in terms of tantalum was 5.0 g/ml (tantalum amount 125 mg).

Next, the shaped articles was sintered to obtain a barium-oxide mixed tantalum sintered body, and then acid-washed and dried to obtain a tantalum sintered body. The tantalum sintered body had a volume of 22 mm$^3$, a density of 5.7 g/ml, a specific surface area 0.0059 m$^2$/mm$^3$ and a porosity of 66%. Also, the sintered body had pore diameter peak tops at 0.7 μm and 2 μm and the volume of pores of 1 μm or more was 18 vol % of the entire vacancy volume.

Then, 100 units of the tantalum sintered body were prepared, and electrochemically formed at a voltage of 20 V for 600 minutes by using an aqueous 0.1% phosphoric acid solution to form an oxide dielectric film on the surface.

From this electrochemically formed tantalum anode sintered body, a chip capacitor was produced by using Capacitor Production Method 4. The produced capacitor had a capacitance realization ratio of 98% and a capacitance of 703 µF/unit.

EXAMPLES 37 to 39

100 Units of tantalum sintered body implanted with a tantalum lead wire were prepared in the same manner as in Example 36 except that nitriding treatment was conducted in a nitrogen atmosphere at 300° C. for 2 hours respectively before shaping step (Example 37), after shaping but before sintering (Example 38) and after sintering but before removing barium oxide (Example 39). The sintered body units were electrochemically formed at a voltage of 20 V for 600 minutes by using an aqueous 0.1% phosphoric acid solution to form an oxide dielectric film on the surface. Further, from the electrochemically formed tantalum anode sintered body, a chip capacitor was produced by using Capacitor Production Methods 1 to 3. The physical properties, capacitance realization ratio, electrical properties of thus produced capacitors are shown in Tables 6 to 8.

EXAMPLE 40

By a method of reducing potassium tantalum fluoride, a secondary aggregated powder of tantalum having an average particle size of 5 µm where a primary powder having an average particle size of 0.5 µm aggregated was prepared. At room temperature, 300 g of polymethylmethacrylate methyl ester was dissolved in 10 L of toluene. Into this solution, 9 kg of tantalum aggregated powder and 1 kg of calcium oxide powder having an average particle size of 0.9 µm were dispersed and a shaped article was formed by the same manner as in Example 34. The density of the shaped article in terms of tantalum was 5.5 g/ml (tantalum amount 135 mg).

Next, each of these shaped articles was sintered to obtain a calcium-oxide mixed tantalum sintered body, and then acid-washed and dried to obtain a tantalum sintered body. The tantalum sintered body had a volume of 22 mm$^3$, a density of 5.9 g/ml, a specific surface area 0.0055 m$^2$/mm$^3$ and a porosity of 61%. Also, the sintered body had a pore diameter peak top at 0.8 µm and the volume of pores of 1 µm or more was 19 vol % of the entire vacancy volume.

100 Units of the tantalum sintered body were prepared, and electrochemically formed by using an aqueous 0.1% phosphoric acid solution at a voltage of 20 V for 600 minutes to form an oxide dielectric film on the surface. From this electrochemically formed tantalum anode sintered body, a chip capacitor was produced by using Capacitor Production Method 4. The physical properties, capacitance realization ratio, electrical properties of thus produced capacitors are shown in Tables 6 to 8.

EXAMPLES 41 to 59

Granulated products each comprising a mixture of tantalum, a pore-forming agent and a binder were prepared and shaped in the same manner as in Example 36 or 40 using tantalum powders and pore-forming agents differing in the average particle size, and also using a binder such as paraffin, vegetable oil, camphor, polyacryl-based polymer, polymethacryl-based polymer or polyvinyl-based polymer. Subsequently, in each of the Examples, the shaped article was sintered at a temperature of 1000 to 1500° C., and the pore-forming agent was removed by using an appropriate solvent. The resulted sintered body was treated in the same manner as in Examples 36 or 40 to obtain a tantalum sintered body for anode. Further, 100 units of the tantalum sintered body were prepared, and electrochemically formed by using an aqueous 0.1% phosphoric acid solution at a voltage of 20 V for 600 minutes to form an oxide dielectric film on the surface. From this electrochemically formed tantalum sintered body, a chip capacitor was produced by using Capacitor Production Method 4. The physical properties, capacitance realization ratio, electrical properties of thus produced capacitors are shown in Tables 6 to 8.

Comparative Example 12

A tantalum sintered body was prepared by shaping and sintering a tantalum powder in the same manner as in Example 36 except that no pore-forming agent was used. Further, 100 units of the tantalum sintered body were prepared, and subjected to electrochemically formed using an aqueous 0.1% phosphoric acid solution at a voltage of 20 V for 600 minutes to form an oxide dielectric film on the surface. From this electrochemically formed tantalum sintered body, a chip capacitor was produced by using Capacitor Production Method 4. The physical properties, capacitance realization ratio, electrical properties of thus produced capacitors are shown in Tables 6 to 8

Comparative Example 13

A tantalum sintered body was prepared by shaping and sintering a tantalum powder in the same manner as in Example 40 except that no pore-forming agent was used. Further, 100 units of the tantalum sintered body were prepared, and subjected to electrochemically formed using an aqueous 0.1% phosphoric acid solution at a voltage of 20 V for 600 minutes to form an oxide dielectric film on the surface. From this electrochemically formed tantalum sintered body, a chip capacitor was produced by using Capacitor Production Method 4. The physical properties, capacitance realization ratio, electrical properties of thus produced capacitors are shown in Tables 6 to 8.

TABLE 6

| Example No./ Comparative Example No. | Average Particle Size of Tantalum µm | Other Components Contained in Tantalum | Pore-Forming Agent | | |
|---|---|---|---|---|---|
| | | | Kind | Average Particle Size, µm | Amount* Added mass % |
| Ex. 36 | 0.5 | nitrogen | barium oxide | 0.7 | 5 |
| | | | " | 2 | 5 |
| Ex. 37 | 0.5 | nitrogen | barium oxide | 0.9 | 6 |
| | | | " | 3 | 4 |
| Ex. 38 | 0.5 | nitrogen | barium oxide | 0.7 | 6 |
| | | | " | 2 | 4 |

TABLE 6-continued

| Example No./ Comparative Example No. | Average Particle Size of Tantalum μm | Other Components Contained in Tantalum | Pore-Forming Agent Kind | Average Particle Size, μm | Amount* Added mass % |
|---|---|---|---|---|---|
| Ex. 39 | 0.5 | nitrogen | barium oxide | 1.0 | 10 |
| Ex. 40 | 7 | — | calcium oxide | 0.9 | 10 |
| Ex. 41 | 0.5 | rhenium | magnesium carbonate | 0.5 | 3 |
|  |  |  | " | 3 | 4 |
| Ex. 42 | 0.5 | nitrogen | magnesium oxide | 0.9 | 2 |
|  |  |  | " | 2 | 2 |
|  |  |  | " | 8 | 5 |
| Ex. 43 | 0.3 | nitrogen | magnesium oxide | 0.5 | 5 |
|  |  |  | barium oxide | 2 | 5 |
| Ex. 44 | 0.5 | aluminum | magnesium carbonate | 0.9 | 7 |
| Ex. 45 | 0.5 | tungsten | magnesium hydroxide | 0.8 | 7 |
| Ex. 46 | 0.5 | niobium | magnesium oxide | 0.7 | 5 |
|  |  |  | " | 2 | 3 |
| Ex. 47 | 0.5 | hafnium | calcium hydroxide | 0.7 | 10 |
| Ex. 48 | 0.5 | zirconium | barium oxide | 0.7 | 5 |
|  |  |  | calcium oxide | 2 | 3 |
| Ex. 49 | 0.5 | neodymium | neodymium oxide | 0.9 | 11 |
| Ex. 50 | 0.6 | zinc | barium hydroxide | 0.9 | 10 |
| Ex. 51 | 0.5 | boron | magnesium oxide | 0.6 | 8 |
|  |  |  | " | 4 | 2 |
| Ex. 52 | 0.5 | yttrium erbium | yttrium oxide lanthanum oxide | 0.6 2 | 5 5 |
| Ex. 53 | 0.5 | ytterbium lutetium | cerium oxide samarium oxide | 0.8 3 | 8 2 |
| Ex. 54 | 0.3 | tantalum nitrogen | magnesium oxide manganese oxide | 0.7 2 | 4 3 |
| Ex. 55 | 0.5 | manganese | calcium oxide | 0.9 | 8 |
| Ex. 56 | 0.5 | molybdenum vanadium | cerium oxide magnesium oxide | 0.8 2 | 8 4 |
| Ex. 57 | 0.5 | antimony | barium oxide | 0.7 | 8 |
| Ex. 58 | 0.5 | silicon nitrogen | magnesium oxide " | 0.7 2 | 5 3 |
| Ex. 59 | 0.5 | silicon nitride | magnesium oxide " | 0.7 2 | 5 3 |
| Comp. Ex. 12 | 0.5 | — | — | — | — |
| Comp. Ex. 13 | 7 | — | — | — | — |

*The amount of pore-forming agent added is a ratio to the total amount of tantalum component and pore-forming agent.

TABLE 7

| | Properties of Sintered Body | | | | |
|---|---|---|---|---|---|
| | Volume of Sintered Body, mm³ | Porosity, vol % | Pore Peak Top, μm | Volume of Vacancies of 1 μm or more, vol % | Specific Surface Area, m²/mm³ |
| Example 36 | 22 | 66 | 0.7 2.0 | 18 | 0.0059 |
| Example 37 | 22 | 67 | 0.8 2.8 | 19 | 0.0060 |
| Example 38 | 22 | 66 | 0.7 2.9 | 19 | 0.0064 |
| Example 39 | 23 | 64 | 1.0 | 15 | 0.0058 |
| Example 40 | 23 | 62 | 0.8 | 19 | 0.0068 |
| Example 41 | 22 | 68 | 0.5 2.9 | 16 | 0.0058 |
| Example 42 | 23 | 61 | 0.8 1.9 6.1 | 24 | 0.0059 |
| Example 43 | 21 | 60 | 0.5 2.0 | 16 | 0.0093 |
| Example 44 | 23 | 63 | 0.9 | 15 | 0.0068 |
| Example 45 | 22 | 63 | 0.8 | 15 | 0.0071 |
| Example 46 | 22 | 64 | 0.7 1.9 | 16 | 0.0066 |
| Example 47 | 22 | 63 | 0.7 | 15 | 0.0069 |
| Example 48 | 22 | 64 | 0.7 2.1 | 18 | 0.0068 |
| Example 49 | 23 | 62 | 0.8 | 16 | 0.0067 |
| Example 50 | 23 | 62 | 0.9 | 18 | 0.0053 |
| Example 51 | 23 | 63 | 0.6 3.5 | 20 | 0.0064 |
| Example 52 | 22 | 61 | 0.6 1.9 | 17 | 0.0062 |
| Example 53 | 23 | 60 | 0.8 2.8 | 17 | 0.0060 |
| Example 54 | 21 | 61 | 0.7 2.1 | 16 | 0.0095 |
| Example 55 | 22 | 64 | 0.8 | 15 | 0.0064 |
| Example 56 | 23 | 64 | 0.8 1.9 | 18 | 0.0066 |
| Example 57 | 23 | 64 | 0.7 | 17 | 0.0092 |
| Example 58 | 23 | 62 | 0.7 2.0 | 17 | 0.0088 |
| Example 59 | 22 | 62 | 0.7 1.9 | 16 | 0.0104 |

TABLE 7-continued

Properties of Sintered Body

| | Volume of Sintered Body, mm³ | Porosity, vol % | Pore Peak Top, μm | Volume of Vacancies of 1 μm or more, vol % | Specific Surface Area, m²/mm³ |
|---|---|---|---|---|---|
| Comparative Example 12 | 17 | 52 | 0.5 | 4 | 0.0047 |
| Comparative Example 13 | 18 | 51 | 0.5 | 5 | 0.0043 |

TABLE 8

Properties of Capacitor

| | Capacitor Production Method | Capacitor Realization Ratio | Capacitance μF/unit | ESR mΩ | tan δ % |
|---|---|---|---|---|---|
| Example 36 | 4 | 98 | 703 | 15 | 3 |
| Example 37 | 1 | 97 | 714 | 22 | 3 |
| Example 38 | 2 | 98 | 757 | 21 | 4 |
| Example 39 | 3 | 95 | 692 | 24 | 3 |
| Example 40 | 4 | 95 | 810 | 24 | 3 |
| Example 41 | 2 | 98 | 687 | 28 | 3 |
| Example 42 | 4 | 98 | 708 | 19 | 3 |
| Example 43 | 4 | 95 | 1103 | 19 | 4 |
| Example 44 | 3 | 95 | 806 | 28 | 3 |
| Example 45 | 4 | 95 | 846 | 23 | 4 |
| Example 46 | 3 | 97 | 791 | 26 | 3 |
| Example 47 | 4 | 95 | 817 | 25 | 3 |
| Example 48 | 3 | 96 | 810 | 24 | 3 |
| Example 49 | 4 | 96 | 802 | 25 | 3 |
| Example 50 | 3 | 97 | 627 | 28 | 3 |
| Example 51 | 4 | 98 | 765 | 28 | 3 |
| Example 52 | 3 | 98 | 735 | 24 | 3 |
| Example 53 | 4 | 98 | 709 | 24 | 3 |
| Example 54 | 4 | 95 | 1131 | 22 | 5 |
| Example 55 | 4 | 97 | 764 | 27 | 3 |
| Example 56 | 3 | 98 | 782 | 26 | 3 |
| Example 57 | 3 | 96 | 1107 | 28 | 4 |
| Example 58 | 4 | 97 | 1048 | 27 | 3 |
| Example 59 | 3 | 98 | 1236 | 24 | 5 |
| Comparative Example 12 | 4 | 68 | 559 | 102 | 11 |
| Comparative Example 13 | 4 | 67 | 517 | 85 | 11 |

EXAMPLES 60 to 67

Granulated products each comprising a mixture of tantalum, a barium oxide and polyisobutylmethacrylate were prepared by the same manner as in Example 36. Each mixture granulated product was charged into a hopper of a tantalum device automatic shaping machine (TAP-2R, manufactured by Seiken Co., Ltd.) to give a sintered body having a volume of about 1 to about 500 mm³ and automatically shaped together with a tantalum wire to obtain a shaped article having about the size shown in Table 9 and the shaped article was sintered at 1,250° C. 100 Units of each sintered body were prepared and electrochemically formed at a voltage of 20 V for 600 minutes by using an aqueous 0.1% phosphoric acid solution to form an oxide dielectric film on the surface. From these sintered bodies, chip capacitors were produced by using Capacitor Production Method 4. The capacitance realization ratio of each capacitor is shown in Table 9 and FIG. 2.

Comparative Example 14 to 21

In the same manner as in Comparative Example 12 not using a pore forming agent, the granulated product was charged into a hopper of a tantalum device automatic shaping machine (TAP-2R, manufactured by Seiken Co., Ltd.) to give a sintered body having a volume of about 1 to about 500 mm³ and automatically shaped together with a tantalum wire to obtain a shaped article having about the size shown in Table 9 and the shaped article was sintered at 1,250° C. 100 Units of each sintered body were prepared and electrochemically formed at a voltage of 20 V for 600 minutes by using an aqueous 0.1% phosphoric acid solution to form an oxide dielectric film on the surface. From these sintered bodies, chip capacitors were produced by using Capacitor Production Method 4. The capacitance realization ratio of each capacitor is shown in Table 9 and FIG. 2.

Figure 2:
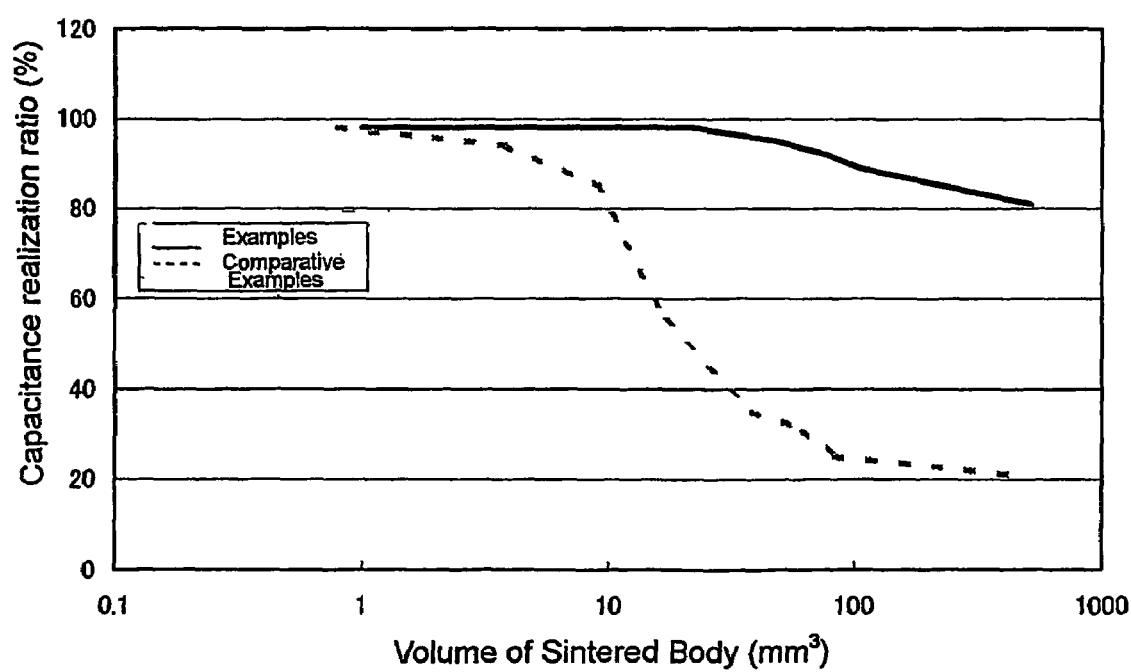
FIG. 2 is a graph showing the capacitance realization ratio of capacitors of Examples 60 to 67 and Comparative Examples 14 to 21.

As clearly shown in Table 9 and FIG. 2, in Comparative Examples 14 to 21, capacitors having a sintered body volume of about 5 mm³ or less exhibited excellent capacitance realization ratios while those having a sintered body volume of about 10 mm³ or more were drastically reduced in the capacitance realization ratio. On the other hand, in Examples 60 to 67, the produced capacitors, even those having a sintered body volume of 10 mm³ or more, could obtain high capacitance realization ratios. That is, the capacitors produced in the Examples 60 to 67 evidenced that according to the present invention, the capacitor using a large-sized sintered body of volume of 10 mm³ or more can exhibit a particularly excellent capacitance realization ratio.

TABLE 9

| Example No. | Size of Shaped Article, mm | Volume of Sintered Body, mm³ | Capacitance Realization ratio, % |
|---|---|---|---|
| Example 60 | 1.1 × 1.0 × 1.1 | 1 | 98 |
| Example 61 | 1.9 × 1.1 × 2.5 | 4.6 | 98 |
| Example 62 | 2.6 × 1.4 × 3.3 | 11 | 98 |
| Example 63 | 3.3 × 1.8 × 4.2 | 22 | 98 |
| Example 64 | 4.3 × 2.3 × 5.6 | 49 | 95 |
| Example 65 | 5.0 × 2.7 × 6.5 | 78 | 92 |
| Example 66 | 5.5 × 3.0 × 7.2 | 106 | 89 |
| Example 67 | 9.2 × 5.0 × 12.1 | 512 | 81 |
| Comparative Example 14 | 1.1 × 1.0 × 1.1 | 0.8 | 98 |
| Comparative Example 15 | 1.9 × 1.1 × 2.5 | 3.8 | 94 |
| Comparative Example 16 | 2.6 × 1.4 × 3.4 | 9 | 85 |
| Comparative Example 17 | 3.3 × 1.8 × 4.2 | 17 | 55 |
| Comparative Example 18 | 4.3 × 2.3 × 5.6 | 39 | 35 |
| Comparative Example 19 | 5.0 × 2.7 × 6.5 | 62 | 31 |
| Comparative Example 20 | 5.5 × 3.0 × 7.2 | 85 | 25 |
| Comparative Example 21 | 9.2 × 5.0 × 12.1 | 421 | 21 |

EXAMPLE 68

In the same manner as in Examples 36, 37, 40, 41, 43, 45, 49, 54, 64, 65, 66 and 67, 100 units of each sintered body were produced and electrochemically formed at a temperature of 80° C. and a voltage of 20 V for 600 minutes by using an aqueous 0.1% phosphoric acid solution to form an oxide dielectric film on the 10 surface. The 100 units were divided into two 50-unit groups, and each of the 50 electrochemically formed sintered body units was impregnated with two kinds of cathode materials according to Capacitor Production Method 2 or 4. Thereafter, a carbon paste and a silver paste were sequentially stacked and the entirety was molded with an epoxy resin to produce a chip capacitor. The capacitance realization ratio, moisture resistance and ESR stability of each capacitor produced are shown in Table 10.

Comparative Example 22

In the same manner as in Comparative Examples 12, 13, 18, 19, 20 and 21, 100 units of each sintered body were produced and electrochemically formed at a temperature of 80° C. and a voltage of 20 V for 600 minutes by using an aqueous 0.1% phosphoric acid solution to form an oxide dielectric film on the surface. The 100 units were divided into two 50-unit groups, and according to Capacitor Production Methods 2 and 4, each of the 50 electrochemically formed sintered body units was impregnated with two kinds of cathode materials. Thereafter, a carbon paste and a silver paste were sequentially stacked and the entirety was molded with an epoxy resin to produce a chip capacitor. The capacitance realization ratio, moisture resistance and ESR stability of each capacitor produced are shown in Table 10.

Table 10 shows that the capacitor produced in Example 68 is excellent in moisture resistance and ESR stability as compared with the capacitor produced in Comparative Example 22.

TABLE 10

| Example No./ Comparative Example No. | Sintered body was prepared in the same manner as in | Capacitor Production Method | number of units having a moisture resistance less than 110% | number of units having an ESR stability less than 100 + 10% |
|---|---|---|---|---|
| Example 68 | Example 36 | 2 | 50/50 | 50/50 |
| | | 4 | 50/50 | 50/50 |
| | Example 37 | 2 | 50/50 | 50/50 |
| | | 4 | 50/50 | 50/50 |
| | Example 40 | 2 | 50/50 | 50/50 |
| | | 4 | 50/50 | 50/50 |
| | Example 41 | 2 | 50/50 | 50/50 |
| | | 4 | 50/50 | 50/50 |
| | Example 43 | 2 | 50/50 | 50/50 |
| | | 4 | 50/50 | 50/50 |
| | Example 45 | 2 | 50/50 | 50/50 |
| | | 4 | 50/50 | 50/50 |
| | Example 49 | 2 | 50/50 | 50/50 |
| | | 4 | 50/50 | 50/50 |
| | Example 54 | 2 | 50/50 | 50/50 |
| | | 4 | 50/50 | 50/50 |
| | Example 64 | 2 | 50/50 | 50/50 |
| | | 4 | 50/50 | 50/50 |
| | Example 65 | 2 | 49/50 | 49/50 |
| | | 4 | 48/50 | 48/50 |
| | Example 66 | 2 | 48/50 | 48/50 |
| | | 4 | 48/50 | 49/50 |
| | Example 67 | 2 | 47/50 | 47/50 |
| | | 4 | 48/50 | 47/50 |
| Comparative Example 22 | Comparative Example 12 | 2 | 41/50 | 36/50 |
| | | 4 | 43/50 | 34/50 |
| | Comparative Example 13 | 2 | 36/50 | 36/50 |
| | | 4 | 37/50 | 35/50 |
| | Comparative Example 18 | 2 | 10/50 | 2/50 |
| | | 4 | 8/50 | 2/50 |
| | Comparative Example 19 | 2 | 3/50 | 1/50 |
| | | 4 | 2/50 | 0/50 |
| | Comparative Example 20 | 2 | 0/50 | 1/50 |
| | Example 20 | 4 | 1/50 | 1/50 |
| | Comparative Example 21 | 2 | 0/50 | 0/50 |
| | | 4 | 0/50 | 0/50 |

INDUSTRIAL APPLICABILITY

The present invention provides a production method for a valve-acting metal sintered body for use as the anode of a solid electrolytic capacitor, comprising a step of coating/printing/shaping a granulated product of a mixed dispersion containing a pore-forming agent, an organic binder and a primary powder or secondary aggregated powder of at least one member selected from a group consisting of valve-acting metal, a valve-acting metal compound and a valve-acting metal alloy or a granulated powder thereof, and a solvent, or a step of compressing and shaping the granulated product of a mixture obtained by removing the solvent from the dispersion, a step of sintering the resulting shaped article containing a pore-forming agent, and a step of removing the pore-forming agent contained in the resulting sintered body, and a solid electrolytic capacitor using the valve-acting metal sintered body obtained by the production method.

According to the present invention, a valve-acting metal sintered body for anode of a solid electrolytic capacitor, having a high capacitance, well impregnated with cathode material, exhibiting excellent physical properties particularly when having a large volume van be obtained, and by using the sintered body, a capacitor having a low ESR, an excellent tan δ property and good long-term reliability such as moisture resistance and heat-resistance.

The invention claimed is:

1. A method for producing a valve-acting metal sintered body for use as the anode of a solid electrolytic capacitor, which comprises dispersing, coating and shaping a granulated product of a mixture containing a pore-forming agent, an organic binder and particles of a primary powder or secondary aggregated powder of at least one member selected from a group consisting of valve-acting metal, a valve-acting metal compound and a valve-acting metal alloy or a granulated powder thereof, or compressing and shaping the granulated product, sintering the resulting shaped article, and removing the pore-forming agent contained in the resulting sintered body;

wherein particles constituting the valve-acting metal compound and valve-acting metal alloy each contains therein at least one compound selected from the group consisting of niobium monoxide, silicon nitride and antimony;

wherein the pore-forming agent used for the preparation of the granulated product is a powder particle having an average particle size distribution of 0.1 to 100 μm, the particle size distribution of the pore-forming agent has a plurality of peaks, and wherein out of the plurality of peaks, at least one peak is present in the particle size of 0.1 to 1.0 μm and at least one peak is present in the particle size of 1.0 μm or more.

2. The production method as claimed in claim 1, which comprises compressing and shaping a granulated product of a mixture containing a pore-forming agent, an organic binder and a primary powder or secondary aggregated powder of at least one member selected from a valve-acting metal, a valve-acting metal compound and a valve-acting metal alloy or a granulated powder thereof, sintering the resulting shaped article, and removing the pore-forming agent contained in the resulting sintered body.

3. The production method as claimed in claim 1, which comprises doping the granulated product of the mixture with at least one element selected from the group consisting of nitrogen, oxygen, boron, phosphorus, sulfur, selenium and tellurium before forming the shaped article.

4. The production method as claimed in claim 1, which comprises doping the shaped article with at least one element selected from the group consisting of nitrogen, oxygen, boron, phosphorus, sulfur, selenium and tellurium after forming the shaped article but before sintering.

5. The production method as claimed in claim 1, which comprises doping the sintered body containing the pore-forming agent with at least one element selected from the group consisting of nitrogen, oxygen, boron, phosphorus, sulfur, selenium and tellurium after sintering but before removing the pore-forming agent.

6. The production method as claimed in claim 1, wherein the valve-acting metal compound and valve-acting metal alloy each further contains at least one element selected from the group consisting of niobium, hydrogen, beryllium, magnesium, calcium, strontium, barium, scandium, yttrium, titanium, zirconium, hafnium, vanadium, tantalum, chromium, molybdenum, tungsten, manganese, rhenium, ruthenium, osmium, rhodium, iridium, palladium, platinum, silver, gold, zinc, cadmium, mercury, boron, aluminum, gallium, indium, thallium, carbon, silicon, germanium, tin, lead, nitrogen, phosphorus, arsenic, antimony, bismuth, oxygen, sulfur, selenium, tellurium, lanthanum, cerium, praseodymium, neodymium, samarium, europium, gadolinium, terbium, dysprosium, holmium, erbium, thulium, ytterbium and lutetium.

7. The production method as claimed in claim 6, wherein the valve-acting metal compound and valve-acting metal alloy each contains tantalum or niobium.

8. The production method as claimed in claim 1, wherein the silicon nitride is a compound represented by the formula $Si_\alpha N_\beta$ (in the formula, $\alpha$ and $\beta$ each represent a positive integer).

9. The production method as claimed in claim 1, wherein the silicon nitride is at least one compound selected from the group consisting of $SiN$, $Si_2N_2$, $Si_2N_3$ and $Si_3N_4$.

10. The production method as claimed in claim 1, wherein the primary powder of at least one member selected from a valve-acting metal, a valve-acting metal compound and a valve-acting metal alloy has an average particle size of 0.01 to 2 μm.

11. The production method as claimed in claim 1, wherein the secondary aggregated powder of at least one member selected from a valve-acting metal, a valve-acting metal compound and a valve-acting metal alloy has an average particle size of 0.1 to 20 μm.

12. The production method as claimed in claim 1, wherein the granulated powder of a primary powder or secondary aggregated powder of at least one member selected from a valve-acting metal, a valve-acting metal compound and a valve-acting metal alloy has an average particle size of 0.2 to 200 μm.

13. The production method as claimed in claim 10, wherein the valve-acting metal, the valve-acting metal compound and the valve-acting metal alloy are respectively, niobium, niobium compound and niobium alloy.

14. The production method as claimed in claim 1, wherein the pore-forming agent is an oxide which is present as a solid at the temperature of sintering the shaped article.

15. The production method as claimed in claim 14, wherein the oxide is an oxide of an element of Groups 1 to 5 and 7-15 in the Periodic Table.

16. The production method as claimed in claim 14, wherein the oxide is an oxide of at least member selected from the group consisting of lithium, sodium, potassium, beryllium, magnesium, calcium, strontium, barium, scandium, yttrium, lanthanum, titanium, zirconium, hafnium, vanadium, rhenium, iron, ruthenium, cobalt, rhodium, iridium, nickel, copper, cadmium, mercury, boron, aluminum, gallium, indium, thallium, silicon, germanium, lead, antimony, bismuth, cerium, praseodymium, neodymium, samarium, europium, gadolinium, terbium, dysprosium, holmium, erbium, thulium, ytterbium and lutetium.

17. The production method as claimed in claim 14, wherein the compound of giving an oxide is at least one member selected from a group consisting of a hydroxide, a carbonate and a hydrogencarbonate.

18. The production method as claimed in claim 1, wherein the pore-forming agent is at least one compound selected from the group consisting of sodium carbonate, sodium hydrogencarbonate, potassium carbonate, potassium hydrogencarbonate, lithium oxide, lithium carbonate, magnesium oxide, magnesium hydroxide, magnesium carbonate, magnesium hydrogencarbonate, calcium magnesium carbonate, calcium oxide, calcium hydroxide, calcium carbonate, barium oxide, barium carbonate, hafnium oxide, yttrium oxide, yttrium hydroxide, yttrium carbonate, lanthanum oxide, lanthanum hydroxide, lanthanum carbonate, cerium oxide, cerium hydroxide, cerium carbonate, neodymium oxide, neodymium hydroxide, neodymium carbonate, samarium oxide, samarium hydroxide, samarium carbonate, manganese carbonate, iron oxide, iron hydroxide, iron carbonate, iron magnesium oxide, iron lead oxide, barium zinc oxide, boron oxide, aluminum oxide, aluminum hydroxide, lead oxide and lead carbonate.

19. The production method as claimed in claim 1, wherein the organic binder is at least one member selected from the group consisting of camphor, naphthalene, soap fatty acids, carbowax, vegetable wax, purified paraffin, acrylic polymers, methacrylic polymers, vinyl-based polymers and polyethylene carbonate.

20. The production method as claimed in claim 1, which comprises removing the pore-forming agent with at least one member selected from the group consisting of water, an organic solvent, an acidic solvent, an alkaline solvent, an amine solvent, an amino acid solvent, a polyphosphoric acid solvent, a crown ether solvent, a chelating solvent, an ammonium salt solvent and an ion exchange resin-dispersed solvent.

21. The production method as claimed in claim 1, which further comprises providing a valve-acting metal lead.

22. The production method as claimed in claim 21, which comprises providing a lead by compressing and shaping the granulated product together with a valve-acting metal lead during the compression and shaping, thereby implanting the valve-acting metal lead.

23. The production method as claimed in claim 21, wherein said providing a lead is performed by welding a valve-acting metal lead to the sintered body after removing the pore-forming agent.

24. The production method as claimed in claim 1, wherein the granulated product comprises a mixture containing a pore-forming agent, an organic binder and a primary powder or secondary aggregated powder of at least one member selected from a group consisting of valve-acting metal, a valve-acting metal compound and a valve-acting metal alloy or a granulated powder thereof, and the granulated product has an average particle size of 10 to 1,000 μm.

25. The production method as claimed in claim 1, wherein the granulated product comprises a mixture containing a pore-forming agent, an organic binder and a primary powder or secondary aggregated powder of at least one member selected from a group consisting of valve-acting metal, a valve-acting metal compound and a valve-acting metal alloy or a granulated powder thereof, and the granulated product has a repose angle of 60° or less.

26. The production method as claimed in claim 1, wherein the granulated product comprises a mixture containing a pore-forming agent, an organic binder and a primary powder or secondary aggregated powder of at least one member selected from a group consisting of valve-acting metal, a valve-acting metal compound and a valve-acting metal alloy or a granulated powder thereof, and the granulated product has a flowability of 0.1 $cm^3/g$ or more.

27. The production method as claimed in claim 6, wherein the valve-acting metal compound or a valve-acting metal alloy each contains at least one element selected from the group consisting of hydrogen, yttrium, zirconium, hafnium, vanadium, tantalum, niobium, molybdenum, tungsten, manganese, rhenium, zinc, boron, aluminum, silicon, nitrogen, antimony, oxygen, neodymium, erbium, ytterbium and lutetium.

28. The production method as claimed in claim 27, wherein the valve-acting metal compound or a valve-acting metal alloy each contains silicon and nitrogen.

* * * * *